(12) United States Patent
Laverdiere et al.

(10) Patent No.: US 7,543,596 B2
(45) Date of Patent: Jun. 9, 2009

(54) LIQUID FLOW CONTROLLER AND PRECISION DISPENSE APPARATUS AND SYSTEM

(75) Inventors: Marc Laverdiere, Wakefield, MA (US); Robert F. McLoughlin, Pelham, NH (US); George Gonnella, Pepperell, MA (US); Iraj Gashgaee, Waltham, MA (US); Jennifer Marrs, Cornish, NY (US)

(73) Assignee: Entegris, Inc., Chaska, MN (US)

( * ) Notice: Subject to any disclaimer, the term of this patent is extended or adjusted under 35 U.S.C. 154(b) by 409 days.

(21) Appl. No.: 10/520,635

(22) PCT Filed: Jul. 18, 2003

(86) PCT No.: PCT/US03/22579

§ 371 (c)(1),
(2), (4) Date: Mar. 21, 2005

(87) PCT Pub. No.: WO2004/010474

PCT Pub. Date: Jan. 29, 2004

(65) Prior Publication Data

US 2005/0173003 A1 Aug. 11, 2005

Related U.S. Application Data

(60) Provisional application No. 60/397,162, filed on Jul. 19, 2002, provisional application No. 60/397,053, filed on Jul. 19, 2002.

(51) Int. Cl.
*G05D 7/06* (2006.01)

(52) U.S. Cl. ............... 137/14; 137/487.5; 137/487; 251/126

(58) Field of Classification Search ............ 137/12, 137/14, 487, 487.5; 251/118, 126; 700/282, 700/283
See application file for complete search history.

(56) References Cited

U.S. PATENT DOCUMENTS 4,705,461 A  11/1987  Clements (Continued)

FOREIGN PATENT DOCUMENTS

JP  08-185229  7/1996

(Continued)

OTHER PUBLICATIONS

The American Society of Mechanical Engineers; Sixth Edition 1971; "Fluid Meters—Their Theory and Application"; Report of ASME Research Committee on Fluid Meters.

(Continued)

*Primary Examiner*—Kevin L Lee
(74) *Attorney, Agent, or Firm*—Nields, Lemack & Frame, LLC

(57) ABSTRACT

Apparatus and a control system for monitoring (preferably digitally) and/or controlling pressure to a pneumatic load such as a proportional fluid control valve and using a measurement input from a fluid measurement device that responds to a flow rate, the liquid measurement input being used to control the pressure to the pneumatic load so that pneumatic load may be increased or decreased (to proportionally open or close the pneumatic valve) to change the flow rate of the fluid to a desired rate. The pneumatic load can also be adjusted (to proportionally open or close the pneumatic valve) to accommodate changes in temperature and viscosity of a fluid.

15 Claims, 32 Drawing Sheets

U.S. PATENT DOCUMENTS

| | | | |
|---|---|---|---|
| 5,251,148 A * | 10/1993 | Haines et al. | 700/282 |
| 5,303,731 A * | 4/1994 | Vavra et al. | 137/468 |
| 5,882,408 A | 3/1999 | Fujita | |
| 5,983,926 A | 11/1999 | Mastuzawa | 137/500 |
| 5,985,357 A | 11/1999 | Sanada | |
| 6,065,492 A * | 5/2000 | Bergamini | 137/487 |
| 6,102,071 A | 8/2000 | Walton et al. | |
| 6,152,162 A * | 11/2000 | Balazy et al. | 137/110 |
| 6,173,735 B1 | 1/2001 | Perry, Jr. et al. | |
| 6,190,565 B1 | 2/2001 | Bailey et al. | |
| 6,348,098 B1 | 2/2002 | McLoughlin et al. | |
| 6,539,968 B1 * | 4/2003 | White et al. | 137/10 |
| 6,584,999 B2 * | 7/2003 | Inayama et al. | 137/487.5 |
| 6,668,848 B2 * | 12/2003 | Lafler et al. | 137/1 |
| 6,680,078 B2 | 1/2004 | Davlin et al. | |
| 7,069,944 B2 * | 7/2006 | Morikawa et al. | 137/487.5 |

FOREIGN PATENT DOCUMENTS

| | | |
|---|---|---|
| JP | 11-85287 | 3/1999 |
| JP | 2001-236125 | 8/2001 |
| JP | 2002-149242 | 5/2002 |
| WO | 02/25391 | 3/2002 |

OTHER PUBLICATIONS

The International Search Report dated Mar. 23, 2004.

* cited by examiner

| psi | psi | psi |
|---|---|---|
| 0 | 0.88 | 0.84 |
| 4 | 0.92 | 0.84 |
| 6 | 0.92 | 0.84 |
| 8 | 0.92 | 0.92 |
| 10 | 0.92 | 1.04 |
| 12 | 0.92 | 1.28 |
| 14 | 0.92 | 1.92 |
| 16 | 0.92 | 3.32 |
| 18 | 0.92 | 5.12 |
| 20 | 1.08 | 5.44 |
| 22 | 1.36 | 5.48 |
| 24 | 4.88 | 5.48 |
| 26 | 5.28 | 5.48 |
| 28 | 5.44 | 5.48 |
| 30 | 5.48 | 5.48 | six 90° turns two 90° turns with tangential flow for dead space sweeping

Fittings not in-line

○ = turns

45° turn, 90° turn, & 135° turn four 90° turns

LIQUID FLOW CONTROLLER AND PRECISION DISPENSE APPARATUS AND SYSTEM

This application is related to U.S. Pat. No. 6,348,098, Provisional Application Ser. No. 60/397,162 filed Jul. 19, 2002 and entitled "Fluid Flow Measuring and Proportional Fluid Flow Control Device", and claims priority of Provisional Application Ser. No. 60/397,053 filed Jul. 19, 2002 and entitled "Liquid Flow Controller and Precision Dispense Apparatus and System", the disclosures of which are hereby incorporated by reference.

BACKGROUND OF THE INVENTION

During the manufacture of semiconductors, many different fluids must be precisely and accurately dispensed and deposited on the substrate being treated, such as deionized water, photoresist, spin on dielectrics, spin on glass, polyimides, developer and chemical mechanical polishing (CMP) slurries, to name a few. For example, in conventional apparatus for such applications, wafers to be processed are positioned beneath a suitable nozzle that then dispenses a predetermined amount of liquid or slurry to coat or treat the wafer. The predetermined amount is premised on pump cycles, tubing diameters and other characteristics of the fluid containment environment, not only on the absolute amount or mass of fluid deposited on the wafer. Typically the wafer is then rotated to disperse the deposited liquid evenly over the entire surface of the wafer. It is readily apparent that the rate of dispensing and the amount of liquid dispensed are critical in this process.

When fluid flow is stopped through the nozzle, such as between wafer treatments, the potential exists for droplets of liquid from the nozzle to form and fall onto the wafer positioned below the nozzle. This can destroy the pattern being formed on the wafer, requiring that the wafer be discarded or reprocessed. In order to avoid the formation of deleterious droplets on the nozzle, suckback or stop/suckback valves are commonly used. The latter of such valves are typically a dual pneumatically controlled valve pair, with one valve stopping the flow of liquid to the nozzle, and the other drawing the liquid back from the dispense end or outlet port of the nozzle. This not only helps prevent droplet formation and dripping at the port, but also helps prevent drying of the exposed surface of the liquid, which can lead to clogging of the nozzle, and reduces fluid contamination at the outlet.

The coating of larger wafers (e.g., 300 mm in diameter and larger) is also problematic, as turbulence issues arise. The rotational speed of the wafer is conventionally used to spread the coating fluid from the center of the wafer where it is applied, radially outwardly to the edge of the wafer. However, this approach creates turbulent airflow over the wafer and can result in uneven or nonuniform coatings. Reducing the spin speed with larger wafers reduces the turbulence at the surface of the wafer, but can introduce new problems. With the reduced speed, the fluid moves slower across the wafer, and thus spreading the fluid to the wafer edge before the fluid begins to setup or dry becomes an issue.

Pumps conventionally have been used to dispense liquids in semiconductor manufacturing operations. However, the pumps suitable for such applications are expensive and require frequent replacement due to excessive wear. In addition, the footprint of such pumps may be too large to be justified for all but the most demanding applications.

Liquid flow controllers such as the NT 6500 (Entegris Corp., Chaska, Minn.) are available that include differential pressure measurement, but they are not adaptable to a wide range of different flow rates and or viscosities. A modular solution to provide easily adjustable pressure drops is desirable.

It therefore would be desirable to provide a flow measurement and dispense system that results in precise, reproducible dispensing of fluid without the foregoing disadvantages. In addition, the present invention may be applied where precise control of fluid flow is desired or required.

It would be further desirable to provide a motorless pump system for accurate, repeatable dispensing of fluids.

It also would be desirable to provide a pneumatic proportional flow valve that is linear or substantially linear, exhibits minimal pressure drop, and exhibits minimal or no hysteresis.

SUMMARY OF THE INVENTION

The problems of the prior art have been overcome by the present invention, which includes apparatus and a control system for monitoring (preferably digitally) and/or controlling pressure to a pneumatic load such as a proportional fluid control valve and using a measurement input from a fluid measurement device that responds to a flow rate, the liquid measurement input being used to control the pressure to the pneumatic load so that pneumatic load may be increased or decreased (to proportionally open or close the pneumatic valve) to change the flow rate of the fluid to a desired rate. The pneumatic load can also be adjusted (to proportionally open or close the pneumatic valve) to accommodate changes in temperature and viscosity of a fluid.

Embodiments of the present invention provides a fluid measurement device that produces a flow measurement signal based upon a created pressure drop across a frictional flow element in fluid communication with the proportional fluid control valve. Fluid pressure can be measured at or near the inlet and at or near the outlet of the frictional flow element, the measurement signals can be amplified and the resulting pressure drop therebetween can be converted to a flow rate output of the fluid being controlled. The flow rate output can be sent to a controller that allows for one or more valves to be modulated to obtain the desired flow rate.

The present invention provides a control system adaptable to a variety of fluids and to fluids having a wide range of viscosities. It offers accurate and repeatable fluid flow control and dispense performance in a cost-effective and flexible manner, responding quickly to real-time process variations and with minimum operator involvement.

The present invention is also directed to a proportional fluid control valve with improved linearity and reduced hysteresis, for liquid fluid controllers and motorless pump systems that utilize the valve. The valve allows for smooth, gentle flow of fluid in a substantially linear fashion, with minimal turns. Preferably the valve is pneumatically actuated. Where temperature is not an issue, the valve can be actuated by any suitable means, including stepper motors, linear motors, voice coils or other force actuators.

The present invention also is directed to an auxiliary input module upstream of and in liquid communication with a flow measurement device that can be incorporated into the motorless pump system to condition fluid prior to being presented to the flow measurement device. This module allows for filling from an unpressurized source such as a barrel. The module also can compensate for inadequate or excessive liquid pressure from a pressurized feed line (house feed or a pressurized canister). The module also can be used to defoam the fluids used in the system.

The present invention provides a motorless pump system that is adaptable to a variety of liquids and feed sources such that it could allow for standardization of numerous dispense points in a semiconductor fab and allow the customer to accommodate additional features such as filtration and temperature control in a modular fashion.

The present invention further provides a versatile molded valve body that requires fewer parts compared to a machined valve. In one embodiment, the molded valve body is designed specifically for flow control and contains two sensor housings with carefully positioned flow paths to optimize the use of space. The sensor housing or housings can be separately formed as inserts, allowing installation in various orientations. By installing the pneumatic and mechanical components in the opposite ends of the valve cavity, the differential pressure of the system can run in reverse and the differential pressure upstream of the valve can be recorded to monitor the supply pressure.

One embodiment of the present invention can include a set of computer readable instructions stored on said computer readable memory and executable by the one or more processors, the set of computer readable instructions comprising instructions executable to receive an upstream pressure signal, receive a downstream pressure signal, calculate an error signal, calculate a valve control signal based on the upstream pressure signal, downstream pressure signal and error signal.

Another embodiment of the present invention, a device comprising a set of computer readable instructions stored on a computer readable memory and executable by the one or more processors, the set of computer readable instructions comprising instructions executable to receive an upstream pressure signal, receive a downstream pressure signal, calculate an error signal, determine a valve gain for a particular valve based on a valve gain curve associated with that valve, wherein the valve gain varies according to the position of the particular valve, calculate a valve control signal based on the upstream pressure signal, downstream pressure signal, error signal and valve gain.

Another embodiment of the present invention is a device comprising a set of computer readable instructions stored on a computer readable memory and executable by the one or more processors, the set of computer readable instructions comprising instructions executable to receive an upstream pressure signal, receive a downstream pressure signal, calculate an error signal based on proportional, integral and derivative values for the upstream pressure signal and downstream pressure signal, add an error gain to the error signal, determine a valve gain for a particular valve based on a valve gain curve associated with that valve, wherein the valve gain varies according to the position of the particular valve, calculate a valve control signal based on the upstream pressure signal, downstream pressure signal, error signal and valve gain, adaptively adjust the valve control signal based on a set of past position values.

DETAILED DESCRIPTION OF THE PRESENT INVENTION

Figure 1:
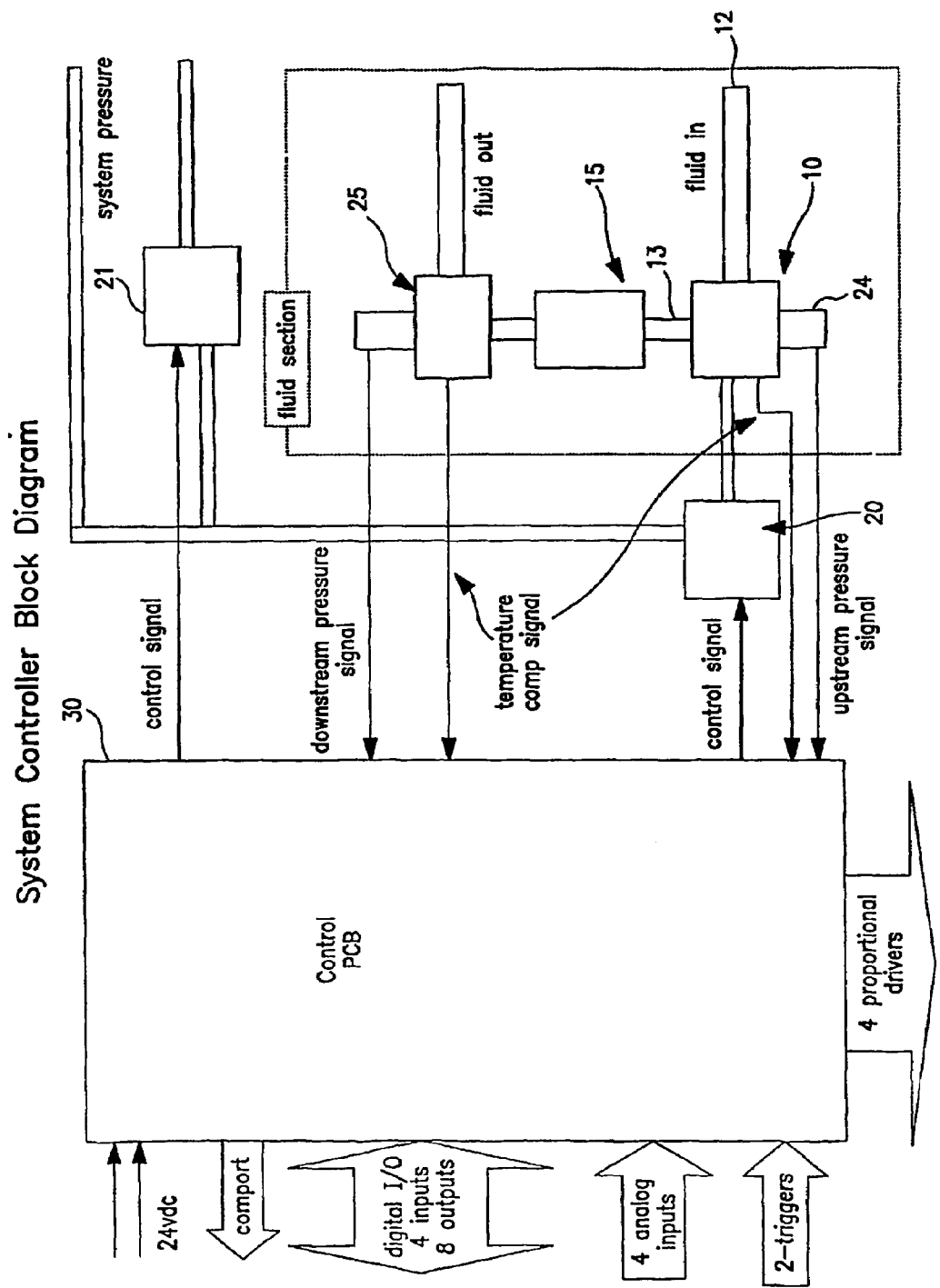
FIG. 1 is a block diagram of an embodiment of the present invention.
Figure 7:
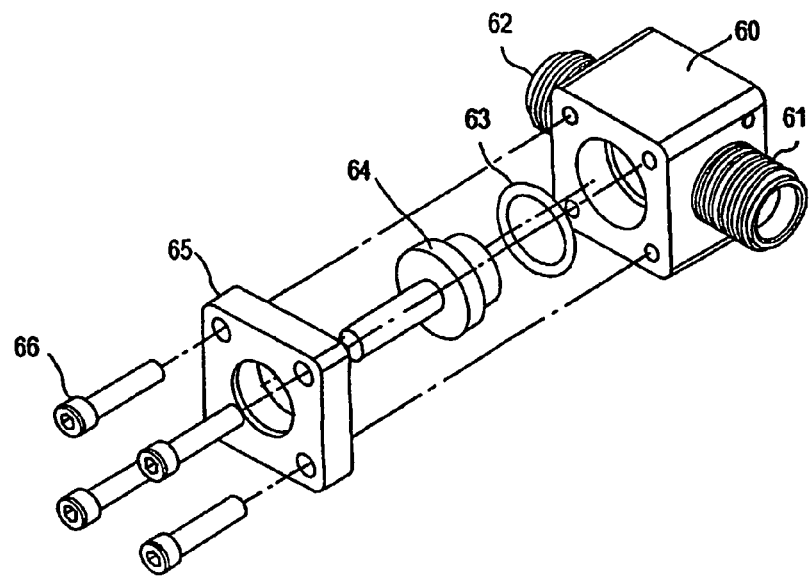
FIG. 7 is an exploded view of a pressure transducer housing assembly in accordance with an embodiment of the present invention.

Turning first to FIG. 1, there is shown a block diagram of the liquid flow controller in accordance with a preferred embodiment of the present invention. A fluid control device such as a pneumatically actuated fluid control valve 10 is shown having a liquid inlet line 12 and a liquid outlet line 13 for ultimate dispensing of the liquid to a point of use, such as a substrate which can be a wafer (not shown). The liquid outlet line 13 is in fluid communication with a frictional flow element 15, such that all of the liquid exiting the fluid control valve 10 enters the frictional flow element 15. A first pressure sensor 24 such as a pressure transducer, which can be integral with the fluid control valve 10 housing, is positioned at or near the inlet of the frictional flow element 15 (such as at or near the outlet of the fluid control valve 10) to sense a first pressure, and a second pressure sensor 25 such as a pressure transducer is positioned at or near the outlet of the frictional flow element 15 to sense a second pressure. Alternatively, a single differential pressure sensing device could be used. The portion of the pressure sensor(s) that contact the fluid is preferably made of an inert material (with respect to the fluid used in the application) such as sapphire, or is coated with a material compatible with the fluids it contacts, such as perfluoropolymer. Details of a suitable pressure sensor are illustrated in FIG. 7. Thus, sensor housing 60 has a fluid inlet 61 and a fluid outlet 62 spaced from inlet 61. Pressure and temperature sensors 64 are sealed in the housing 60 with a perfluoroelastomer O-ring 63. End cap 65 is coupled to housing 60 such as with a plurality of stainless steel bolts or pins 66 as shown. The sensors 64 sense pressure and temperature in the fluid path between the inlet 61 and outlet 62, and sends a signal indicative of the sensed pressure and temperature to a controller.

Referring again to FIG. 1, a pneumatic proportional control valve 20, such as a solenoid, is pneumatically connected to the fluid control valve 10. Each pressure sensor 24, 25 (or a single differential pressure sensing device) is in communication with a computer processor or control circuit 30, such as a controller having proportional, integral and derivative (PID) feedback components. As each sensor 24, 25 samples the pressure and temperature in its respective fluid line, it sends the sampled data to the controller 30. The controller 30 compares the values and calculates a pressure drop across the frictional flow element 15 as discussed in greater detail below. A signal from the controller 30 based on that pressure drop is sent to the pneumatic proportional control valve 20, which modulates the fluid control valve 10 accordingly, preferably after compensating for temperature, and/or viscosity and/or density.

More specifically, the system preferably is calibrated for the fluid being dispensed using a suitable fluid such as deionized water or isopropyl alcohol as a fluid standard. For example, once the system is calibrated to the standard, preferably experimentally, the characteristics of the fluid to be dispensed are inputted or determined automatically, such as viscosity and density, so that the fluid to be dispensed can be compared to the standard and a relationship established. Based upon this relationship, the measured pressure drop (as optionally corrected for temperature, viscosity, etc.) across the frictional flow element, is correlated to a flow rate, compared to the desired or target flow rate, and the fluid control valve 10 is modulated accordingly by the pneumatic proportional control valve 20.

Independently, a suckback valve 21, that is preferably a user programmable proportional valve, is in communication with a proportional control valve such as a solenoid (which can be the same or different from pneumatic proportional control valve 20) and is controlled by the controller (or by a different controller). It is actuated when fluid dispense is stopped or in transition, thereby reducing or eliminating the formation of undesirable droplets that could fall onto the wafer when the fluid dispense operation is interrupted, and drawing the fluid back from the dispense nozzle to minimize or prevent its exposure to atmosphere. The rate and extent of the suckback valve opening and closing is controlled accordingly. Preferably the suckback valve 21 is located downstream of the fluid control valve 10.

By controlling the pressure to the fluid control valve 10 and/or suckback valve 21, various fluid dispensing parameters can be controlled. For example, where the liquid to be dispensed is a low viscosity liquid, the fluid control valve 10 can be carefully modulated using pressure to ensure uniform dispensing of the liquid. Similarly, the rate at which the liquid is dispensed can be controlled, as can the rate at which the liquid is sucked back from the point of dispensing by the suckback valve 21. Once the pressure-to-volume relationship of the particular fluid control valve 10 being used is characterized, unlimited flexibility can be obtained using the system of the present invention. Indeed, dispense pressure is a good indicator of the quality (e.g., uniformity) of the dispense, but an "ideal" dispense pressure profile does not exist for all applications and is not consistent amongst all fluid control valves. The control system of the present invention allows the process engineer to adjust the dispense pressure to achieve the "ideal profile" for a particular process application once the characteristics of the fluid control valve are known.

FIGS. 8A-8E show an integral fluid control valve 10 and sensors assembly in accordance with a preferred embodiment of the present invention. The valve is substantially linear, meaning that as the pressure is increased on the actuation diaphragm, the fluid flow increases accordingly. In addition, the valve exhibits minimal hysteresis. Preferably the pressure (and temperature) sensors are positioned in the fluid stream and the housing 60 is integral with the valve main housing 70, (thus sensing fluid pressure and temperature) just prior to the inlet of the frictional flow element.

With particular reference to FIGS. 8B, 8C, 8D and 8E, valve top cap 71 includes two concentric annular rings 84, 85 that define an annular groove therebetween for receiving a synthetic rubber O-ring 72 that with pneumatic ring 74, seals the valve pneumatic diaphragm 73 in the housing. Opposite threaded valve buttons 76 sandwich valve top diaphragm 77 and valve bottom diaphragm 78, and are biased with spring 80. The inner assembly is held together with the threaded buttons 76 that thread to stainless steel screw 75. The outer assembly is held together with valve bottom cap 82, stainless steel pins or bolts 83, and valve top cap 71. Coupled to valve top cap 71 is a push-on fitting for pneumatic connection to the pneumatic proportional control valve 20 with suitable tubing or the like. The flow path in the fluid control valve 10 (for the inlet and outlet) is not inline to further minimize pressure drop and unswept volume as illustrated in FIGS. 27A-D. The offset flowpaths in and out of the valve allows slurry or other fluids to flow easily and with the least amount of accumulation.

Fluid enters the valve inlet 12 and flows in linear passageway 12A until it reaches annular cavity 90 via inlet aperture 99 therein. The fluid tends to spiral around in cavity 90, then upon the application of pneumatic pressure to open the valve, flows into narrow annular passageway 92 (FIGS. 8B, 8D) past diaphragms 77 and 78, and into cavity 89. A spiraling fluid flow path towards the outlet (through outlet aperture 85) 13 via linear path 13A is generated in cavity 89. In order to minimize the pressure loss between cavities 89 and 90 and to optimize the sweeping action of the fluid in the device with the pressure drop generated, radiused or chamfered shoulders 93 (e.g., 0.04") can be introduced to the sealing surfaces of the valve. Preferably the fluid inlet path 12A and the fluid outlet path 13A are located along the tangential (rather than through the center axis) of cavities 89 and 90, respectively, to assist the fluid in flowing uniformly and to minimize pressure drop and accumulation.

By controlling the pressure entering the push-on straight fitting 86, the amount that the valve pneumatic diaphragm 73 deflects is controlled. The more pressure in pneumatic cavity 88, the more the pneumatic diaphragm 73 will deflect, pushing on the top valve button 76, which causes diaphragms 77 and 78 to deflect, the spring 80 to compress, and unseats diaphragm 78 from the valve seat or shoulder 93 that partially define passageway 92 (FIG. 8D), causing the valve to open. More specifically, the valve is designed so that the spring 80 and pneumatic pressure counter each other. The spring 80 pushes on all three diaphragms, causing the bottom diaphragm 78 to seal the main valve body by seating against shoulder 93. When pneumatic pressure is introduced, it opposes the spring 80. Once enough pressure is applied, the spring is no longer able to hold the valve closed. The spring compresses, causing the diaphragms to deflect in the direction of the compressed spring, opening the valve. The greater the pneumatic pressure, the more the spring 80 compresses, and the more the valve opens.

Besides the suckback option, the speed that the fluid control valve closes also can effectively control the liquid height at the dispense end or outlet port of the nozzle, and in many cases will be able to replace a suckback valve option altogether. This is possible because of the two fluid diaphragms of the valve design. When the valve closes, the pressure is relieved in the pneumatic cavity and the spring load takes over and forces the valve bottom fluid diaphragm 78 (FIG. 8D) to engage at the valve seat seating location. As the fluid diaphragm 78 engages, fluid diaphragm 77 bows outwardly towards the pneumatic cavity. This displacement can cause a small suckback effect.

The controller can include an idle feature that significantly reduces the differences in response time from valve to valve. Depending upon the opening pressure requirements for a given valve, the idle pressure can be adjusted to yield an equal response time from unit to unit. The idle pressure is the pressure provided to the pneumatic cavity when the valve is not being actuated to produce a flow. Thus, if a particular valve requires 40-psi pneumatic pressure to open, and another requires 30-psi pneumatic pressure, the idle pressure can be set for 15-psi and 5-psi, respectively. As a result, both valves require a 25-psi change of pneumatic pressure to open, in approximately the same amount of time. The valve idle feature also acts as a nitrogen purge for the system at a minimal setting requirement. The valve can be held open to allow a minimum level of purge gas, preferably nitrogen, to bleed from the pneumatic proportional control valve to provide a safety purge inside the system enclosure, particularly where the electronics are located.

Figure 30:
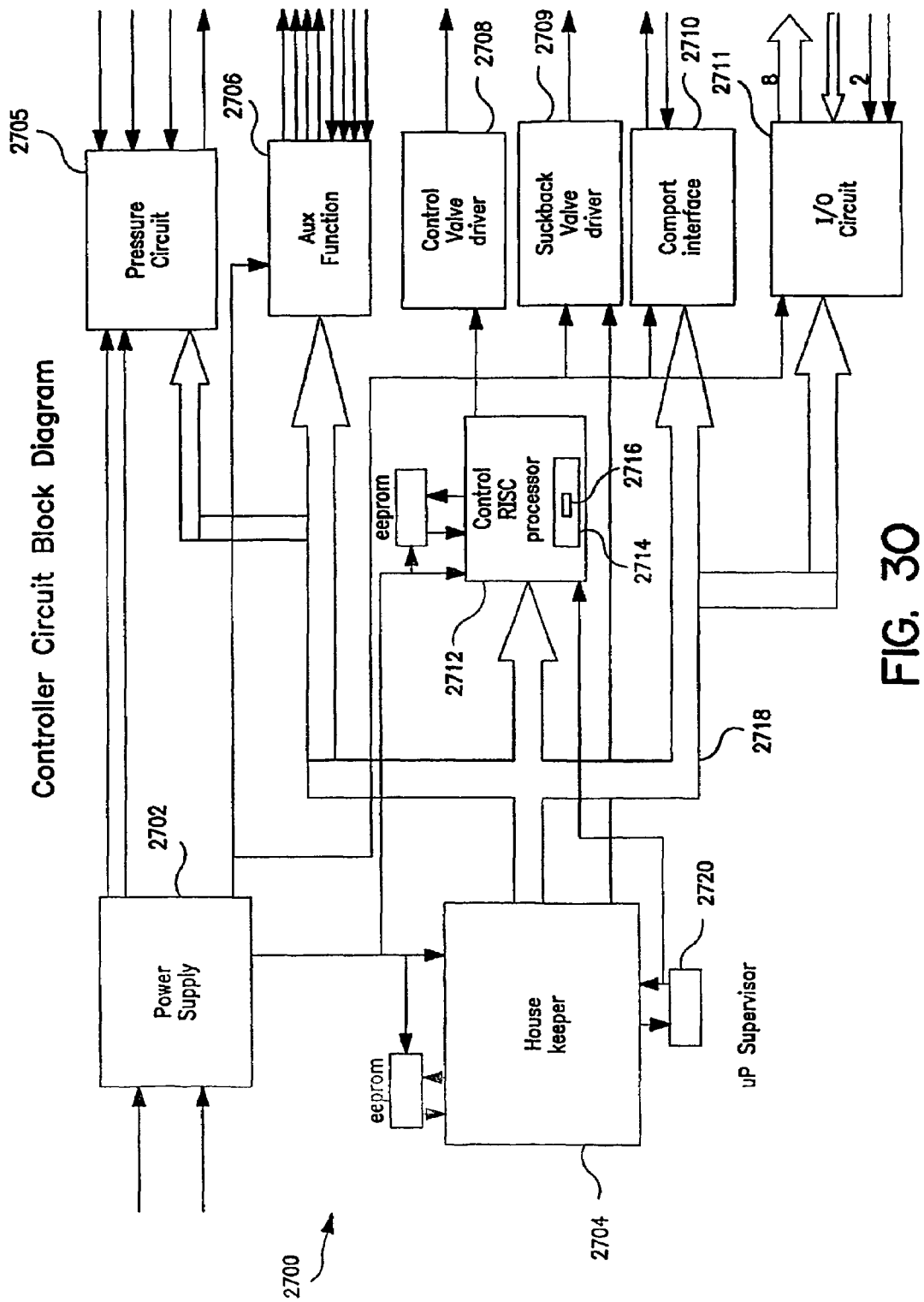
FIG. 30 is a block diagram representation of a controller that can generate a valve drive signal according to one embodiment of the present invention.

FIG. 30 is a block diagram that illustrates one embodiment of a controller 2700 that can generate a valve drive signal to throttle/open pneumatic proportional control valve 20. Controller 2700 can include a power supply 2702, a house keeping processor 2704, a pressure circuit 2705, an auxiliary function circuit 2706, a control valve driver 2708, a suckback valve driver 2709, a comport interface 2710, an I/O circuit 2711 and a control processor 2712. Control processor 2712 can include flash memory 2714 that can store a set of computer readable instructions 2716 that are executable to generate a valve control signal based on pressure signals received from the pressure circuit as described in conjunction with FIG. 6. Various components of controller 2700 can communicate through data bus 2718. It should be noted that while computer readable instructions 2716 are shown as software at a single processor, computer readable instructions can be implemented as software, firmware, hardware instructions or in any suitable programming manner known in the art. Additionally, the instructions can be distributed among multiple memories and can executable by multiple processors.

In operation, power supply 2702 can provide power to the various components of controller 2700. Pressure circuit 2705 can read pressures from upstream and downstream pressure sensors and provide an upstream and downstream pressure signal to control processor 2712. Controller processor 2712 can calculate a valve control signal based on the pressure signals received from pressure circuit 2705 and control valve driver 2708, in turn, can generate a valve drive signal based on the valve control signal. The generation of the valve control signal can occur according to the methodology discussed in conjunction with FIG. 6, below. This methodology can be implemented as software, or other computer readable instructions, stored on a computer readable memory (e.g., RAM, ROM, FLASH, magnetic storage or other computer readable memory known in the art) accessible by control processor 2712.

With respect to other components of controller 2700, house keeping processor 2704 can be a general purpose processor that performs a variety of functions including directing communications with other devices or any other programmable function, known in the art. One example of general purpose processor is a Intel 8051 processor. Auxiliary function circuit 2706 can interface with other devices. Suckback valve driver 2709 can control a suckback valve (e.g., suckback valve 21 of FIG. 1). Comport interface 2710 and I/O circuit 2711 can provide various means by which to communicate data to/from controller 2700. Additional components can include a supervisor unit 2720 that can perform device monitoring functions known in the art, various eeproms or other memories, expansions ports or other computer components known in the art.

Figure 31:
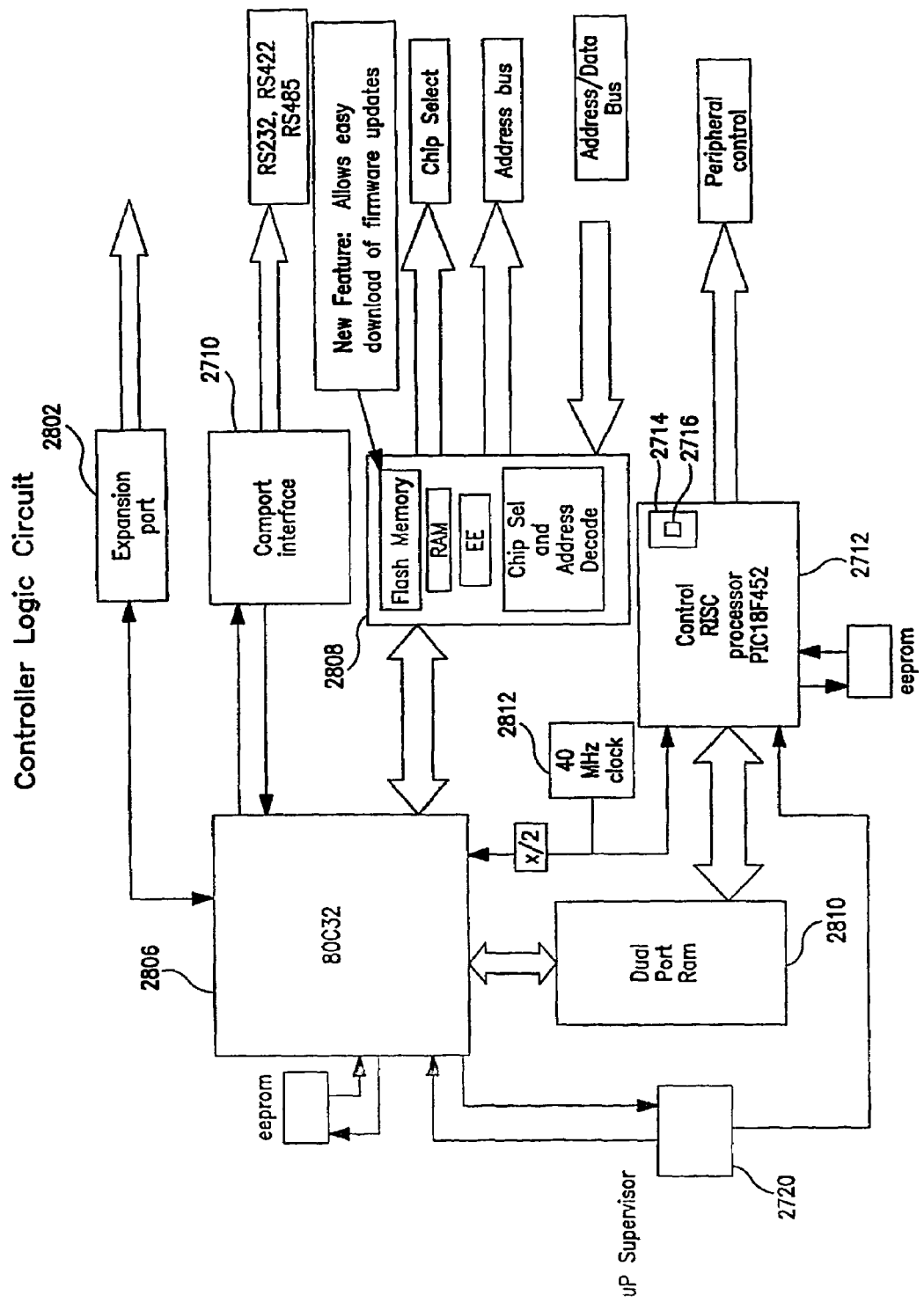
FIG. 31 is a block diagram that illustrates one embodiment of the control logic circuit of a controller.

FIG. 31 is a block diagram that illustrates one embodiment of the control logic circuit of controller 2700 that can generate a valve drive signal to throttle/open proportional control valve 20. Several of the components of controller 2700 are illustrated including control processor 2712, comport interface 2710 and supervisor unit 2720. Additionally, an expansion port 2802 is shown. Expansion port 2802 can be used to add daughter boards to expand the functionality of controller 2700.

In the embodiment of FIG. 31, the functionality of house keeping processor 2704 is split into three portions: processing portion 2806, memory device portion 2808 and dual port RAM portion 2810. Memory device portion 2808 can include various memories including Flash Memory, RAM, EE and other computer readable memories known in the art. One advantage of providing Flash Memory to house keeping processor 2704 is that it allows easy downloads of firmware updates via, for example, comport interface 2710. Additionally memory device portion 2808 can include functionality for chip selections and address decoding. It should be noted that each of memory device portion 2808, dual port RAM portion 2810 and processing portion 2806 can be embodied in a single processor.

Figure 6:
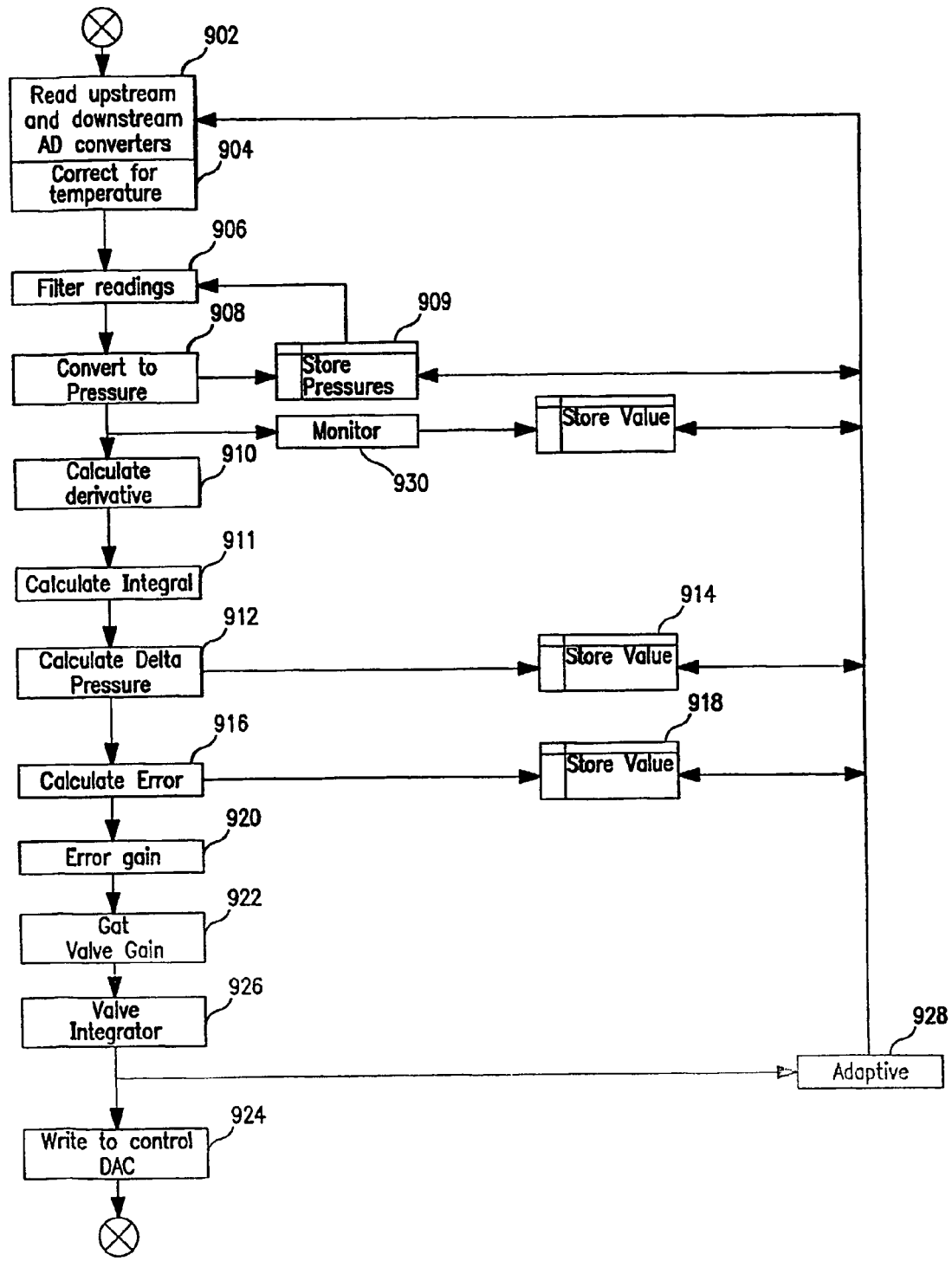
FIG. 6 is a flow diagram of the control system in accordance with an embodiment of the present invention.

Control processor 2712 can include flash memory 2714 that can store a set of computer executable instructions 2716 that are executable to generate a valve control signal based on pressure signals received from the pressure circuit as described in conjunction with FIG. 6. Control processor 2712 and processing portion 2808 of the house keeping processor can share data, in one embodiment of the present invention, through mutual access to dual port RAM portion 2810. Control processor 2712 and processing portion 2808 of the house keeping processor can be driven by a single system clock 2812 (e.g., a 20 MHz clock) or different system clocks.

Figure 32:
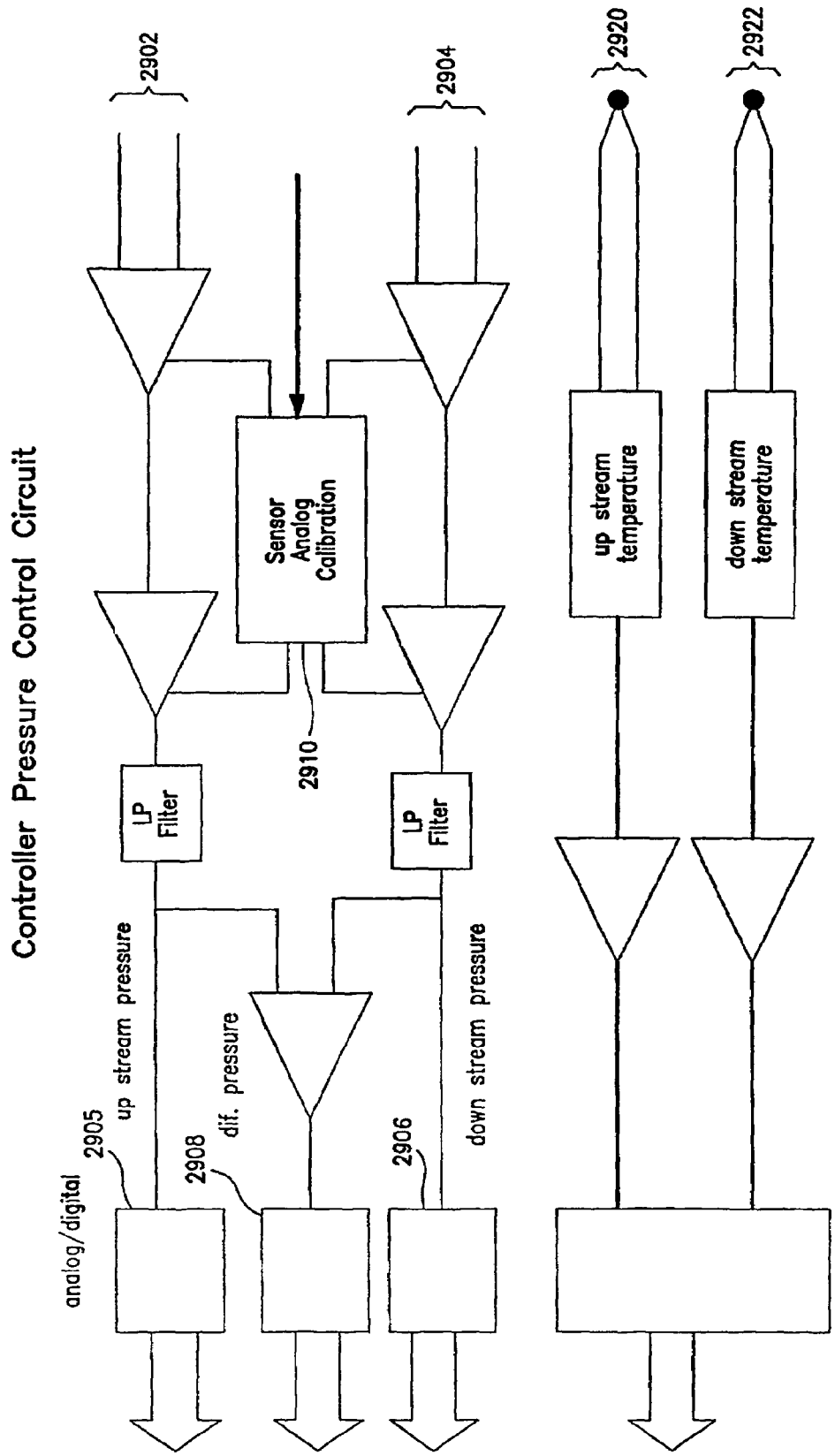
FIG. 32 is a block diagram illustrating one embodiment of a pressure control circuit.

FIG. 32 illustrates one embodiment of the pressure control circuit 2705. Pressure control circuit 2705 can include upstream pressure inputs 2902 and downstream pressure inputs 2904 that come from the upstream and downstream pressure sensors, respectively. The input upstream and downstream signals can be amplified and filter prior to being converted to digital signals by A/D converters 2905 and 2906. As shown in FIG. 32, pressure control circuit 2705 can also generate a differential pressure signal, which can be converted to a digital signal by A/D converter 2908. The pressure control circuit can be calibrated by calibration circuit 2910 that can include hardware and/or software to compensate for changes in sensor readings based on a known pressure applied to the pressure sensors.

Additionally, pressure control circuit 2705 can use receive upstream and downstream input temperature signals (e.g., at inputs 2920 and 2922), which can be amplified and changed to a digital signal at A/D converter. One or both of the pressure sensors 24, 25 (or the differential pressure sensor) each can include a temperature sensing device for sensing the temperature of the fluid at their respective positions (e.g., at or near the frictional flow element inlet or outlet, as the case may be) which can provide the input temperature signals to inputs 2920 and 2922. Alternatively, temperature sensors can be separate from the pressure sensors. The sensed temperatures are communicated to the controller, where a proper fluid flow correction is calculated and a signal sent to the pneumatic proportional valve 20 based upon the calculation to correct for temperature variations. This operation is preferred since the pressure sensor itself can generate heat that is absorbed by the fluid and can effect the fluid flow characteristics in the system; local temperature changes at the sensor face can alter the output of the sensor. Other embodiments of the present invention can correct for temperature error based on, for example, the voltage drop across a constant current device, such as the pressure sensors themselves.

Figure 4:
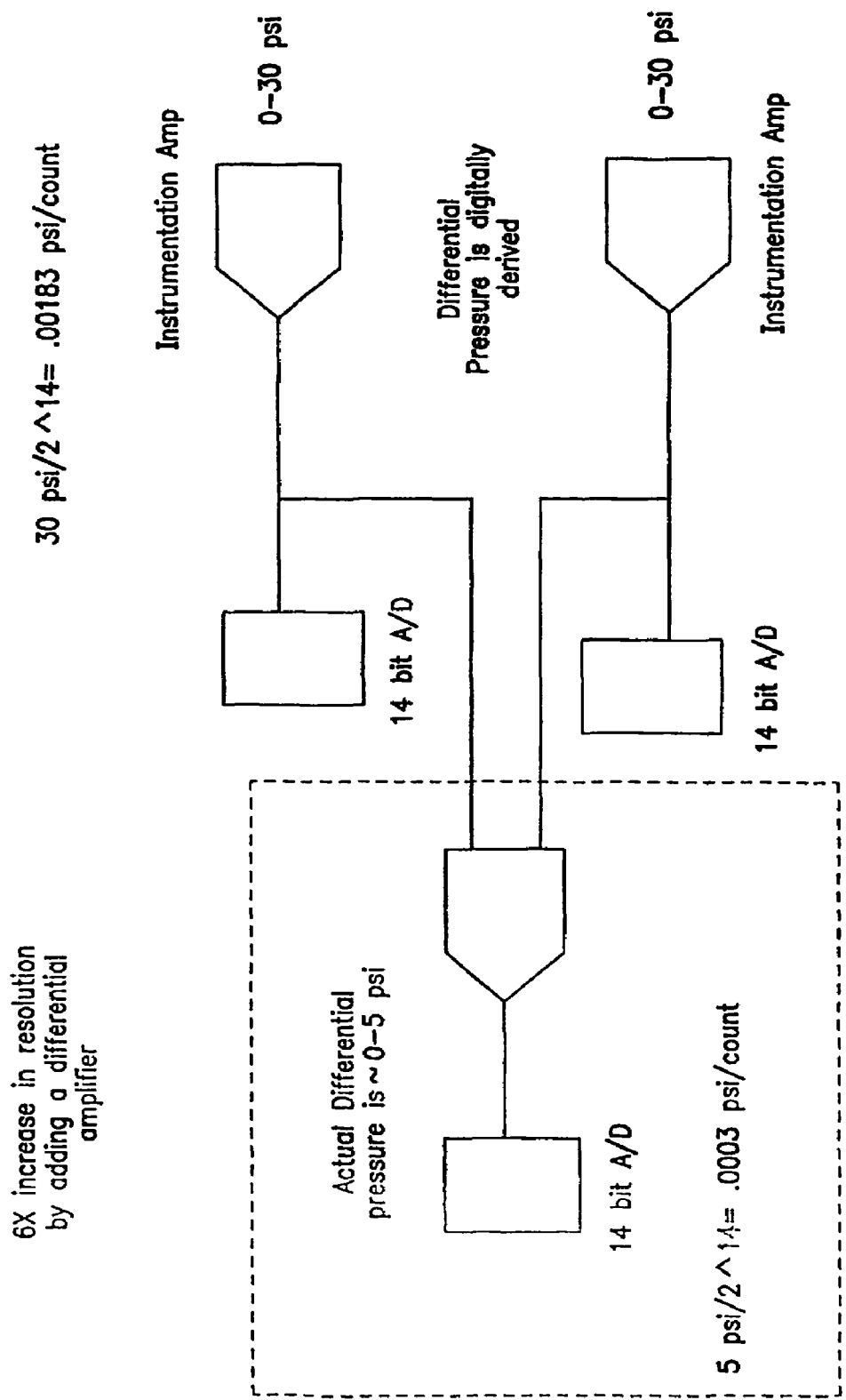
FIG. 4 is a schematic diagram of the differential amplifier circuitry in accordance with an embodiment of the present invention.

FIG. 4 illustrates another embodiment of a pressure control circuit 2705. As shown schematically in FIG. 4, the pressure sensors 24, 25 preferably use two instrumentation amplifiers: one for upstream pressure and the other for the downstream pressure. Digital gain and offset controls are used to calibrate each sensor automatically or manually. These two analog pressure signals can be converted with an analog to digital converter and the differential pressure derived in software by simply subtracting the values. One drawback with this technique is the compromise of resolution and common mode. The analog to digital converter has to convert each signal and mathematically remove the common mode. Increased resolution of the analog to digital converter is preferred to obtain the required differential pressure. For example, if the downstream pressure is 15 psi and the differential pressure for this flow rate is 0.1 psi, the upstream pressure would be 15.1 psi. If full scale pressure is 30 psi, which converts to 5.00 Vdc (15 psi=2.50 Vdc), each converter has to be configured to measure up to the peak pressure (30 psi). Since 15.1 psi is 2.517 Vdc, the differential pressure signal is 0.017 Vdc (out of 5.00 Vdc). By adding a third amplifier in electrical communication with each analog to digital converter, the common mode is removed and the analog to digital converter only has to resolve the maximum differential pressure, which is much less than the common mode. Thus, the full scale differential pressure in the above example is equal to 5 psi which converts to 5.00 Vdc. This increases the resolution by a factor of 6.

The gain of the differential pressure amplifier also can be increased which further increases the resolution of the differential pressure signal. This also can be done with a single differential pressure sensor but the independent signals upstream and downstream pressures, in one embodiment, are not ascertained.

An analog to digital converter for the upstream and downstream pressure also preferably is included. These separate pressures can then be used for monitoring the upstream and downstream pressures and to determine process changes (e.g., filter change-out). They also can be used separately for single pressure control, which can be used in the viscosity calculations.

FIG. 6 is a flow chart illustrating one embodiment of a control algorithm for modulation of the flow control valve 10. The algorithm can be implemented by a controller (e.g., controller 30 of FIG. 1) executing a set of computer instructions stored on a computer readable memory (e.g., RAM, ROM, magnetic storage device or any other computer readable memory known in the art) and can include techniques taken from a Fuzzy logic and elements from an adaptive controller. Thus, the controller is a linear control system that is based on a dynamic model. Adaptation or intelligent control can be used for greater accuracy, where desired. The adaptation control can use a nonlinear optimizer to improve the overall operation of the control system and is within the skill in the art. One embodiment of a controller is illustrated in FIG. 30.

More specifically, with reference to FIG. 6, the controller, at step 902, can read upstream and downstream pressure signals from, for example, analog to digital controllers associated with the upstream and downstream pressure sensors (e.g., A/D converters 2905 and 2906). At this point, the upstream and downstream pressure signals can be voltage samplings (i.e., digital samplings) representing the analog voltages produced by the pressure sensors. At step 904, the controller can also read a temperature based on a temperature sensor reading or calculate a temperature based on the current flow through a sensor and correct the upstream and downstream pressure signals for temperature using any temperature correction algorithm known in the art. At step 906, the controller can filter the upstream and downstream pressure signals and, at step 908, convert the pressure signals to pressure values, which can be stored in memory (step 909).

The controller, at steps 910 and 911, can calculate the integral and derivative values and any corrections thereof, for the upstream and downstream pressures. Calculation of integral and derivative values can be performed according to any method known in the art. The controller can also calculate (step 912) and store (step 914) the difference in upstream and downstream pressures. At step 916, the controller can calculate an error signal based on the derivative and integral values for the upstream and downstream pressures and, at step 918, store the values for the error signal. In one embodiment of the present invention, an error gain can be added to the error signal at step 920. This can help compensate for low signal values at low pressures.

Figure 5:
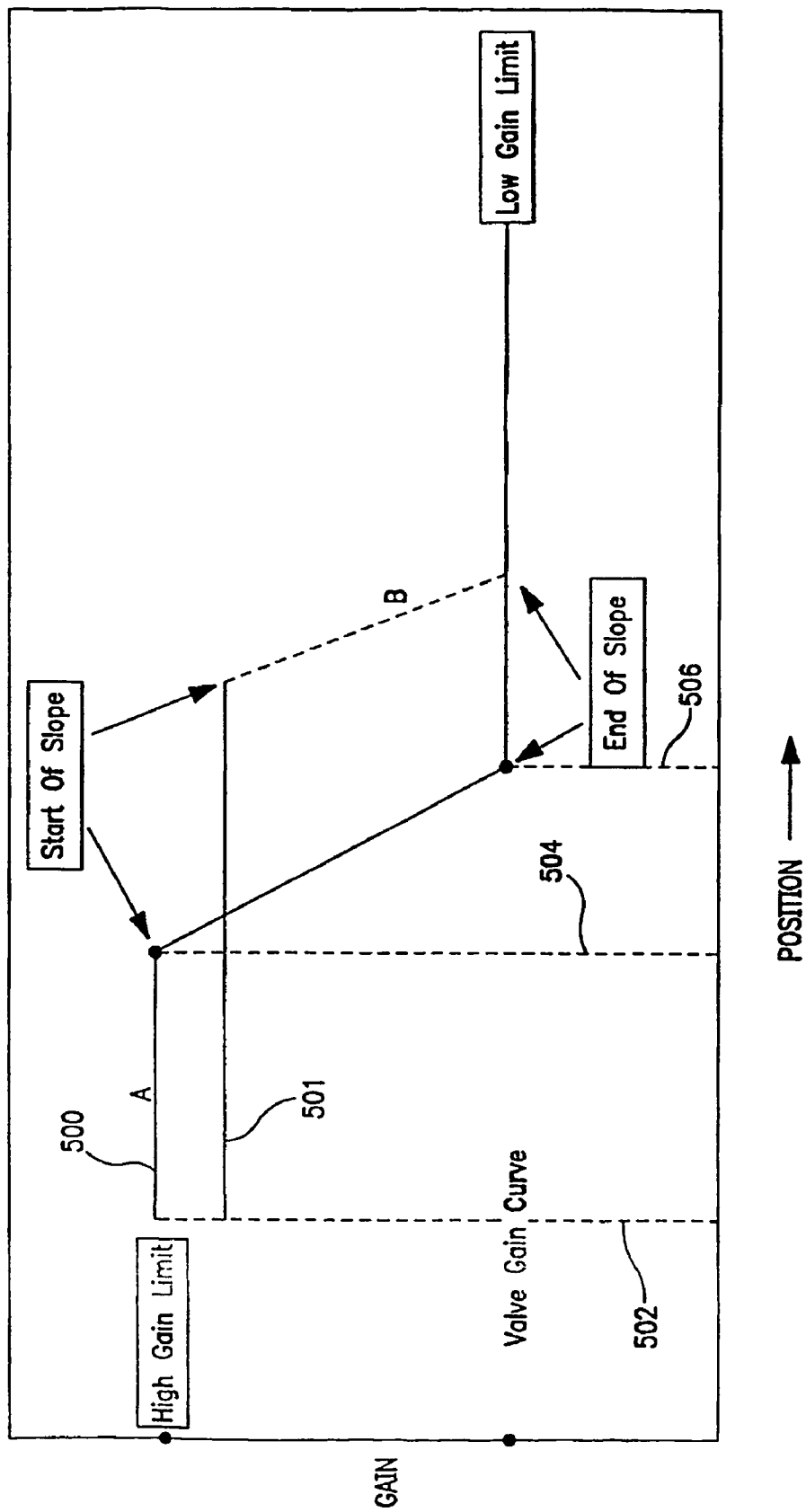
FIG. 5 is a graph of valve gain in accordance with an embodiment of the present invention.

At step 922, the controller can read a valve gain. One embodiment of a valve gain curve is shown in FIG. 5. This curve adjusts the gain of the signal that will be applied to the valve proportionally to the current position. The gain curve implemented in software allows the system to correct for variations from valve to valve. In addition to correcting for variations in a particular valve, the valve gain curve can also compensate for overshoot, undershoot, and response time. In FIG. 5, valve gain curves for two valves, valve A (line 500) and valve B (line 501), are shown. The curves for each valve (or class of valves) can be determined empirically and be stored in the controller's memory. The curve can be used to adjust the gain of the valve control signal based on the current valve position.

In the graph of FIG. 5 the x-axis represents a valve position and the y-axis represents the gain. In one embodiment of the present invention, each curve is created using four (4) points: maximum gain; minimum gain; slope starting point and slope ending point. The maximum gain typically starts at the off position of the valve and extends to the slope staring position. The minimum gain starts at the slope ending position and ends at 100% point of the valve stroke. The actual slope is a linear decrease in gain from the slope starting point to the slope ending point. The controller can read the valve gain curve for the respective valve and adjust the valve control signal accordingly. For example, when the valve A is between lines 502 and 504, the controller can read the valve curve, at step 922, and adjust values for the control signal to account for the high gain. The curve allows for the gain of the valve signal to remain high when valve A is positioned between lines 502 and 504 to overcome the forces that are holding the valve closed. At the point where the valve is actually opening, the controller can adjust the control signal to account for the decreasing gain based on the valve gain curve and valve position. The controller can adjust the control valve signal to account for the valve gain at any point along the valve gain curve. It should be noted, that the valve gain curves illustrated in FIG. 5 are provided by way of example only, and the controller can adjust the valve control signal based on any valve gain curve stored in any computer readable memory accessible by the controller.

At step 924 a control signal can be generated based on the error signal and pressure values and written to a digital to analog converter (e.g., a control valve driver). The digital to analog converter can produce an analog valve drive signal to drive a valve. Embodiments of the present invention can also include a valve integration step (e.g., step 926) to slow the valve control signal and an adaptive adjustment step (e.g., step 928). The adaptive adjustment step can read a predefined number of stored previous position values that can be used to adjust a current valve control signal.

In addition, the controller can also perform monitoring step 930, which can be part of the adaptive adjustment. This function compiles data in real time such as point overshoot, undershoot, settling time, loop stability and percent error. During the setup mode the data compiled is analyzed by the controller and which adjusts control values to optimize the performance (i.e., performs adaptive adjustment step 928).

It should be noted that the controller can also adjust the valve control signal to compensate for viscosity changes. Since the viscosity of the fluid changes the delta P measurements for similar rates, corrections must be made. One method of correction is comparing current delta P and rate to a delta P and rate of a standard such as isopropyl alcohol or water. The differences can then be entered by the user. Another method is to measure internal parameters and compare them to predetermined similar parameters and internally compensate for the differences. The third method uses factory created curves for different fluids; multiple curves can be stored in the controller and selected by the user.

Figure 2:
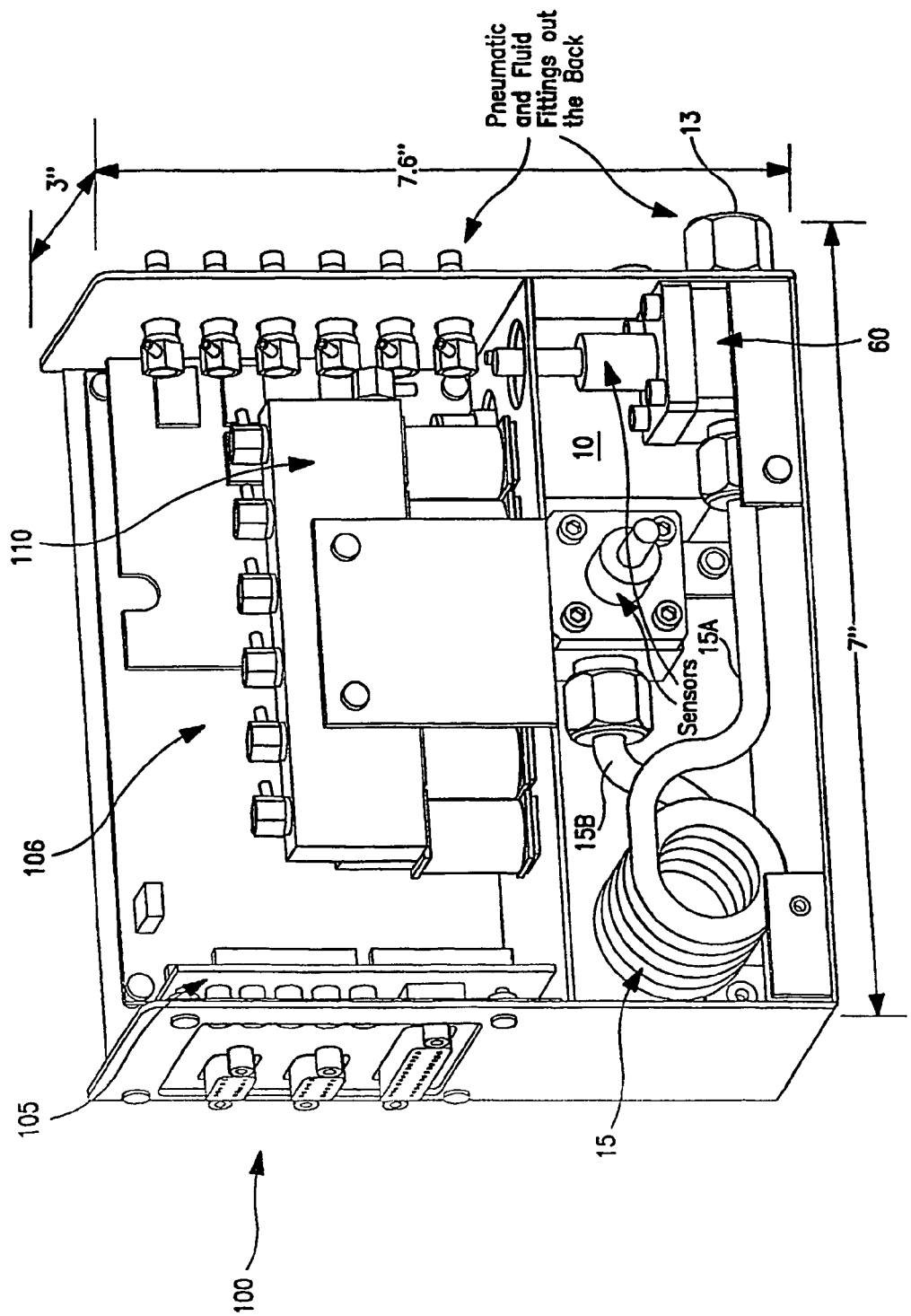
FIG. 2 is a perspective view of the housing containing the pneumatic and fluid control portion of a motorless pump or dispense module in accordance with an embodiment of the present invention.
Figure 29:
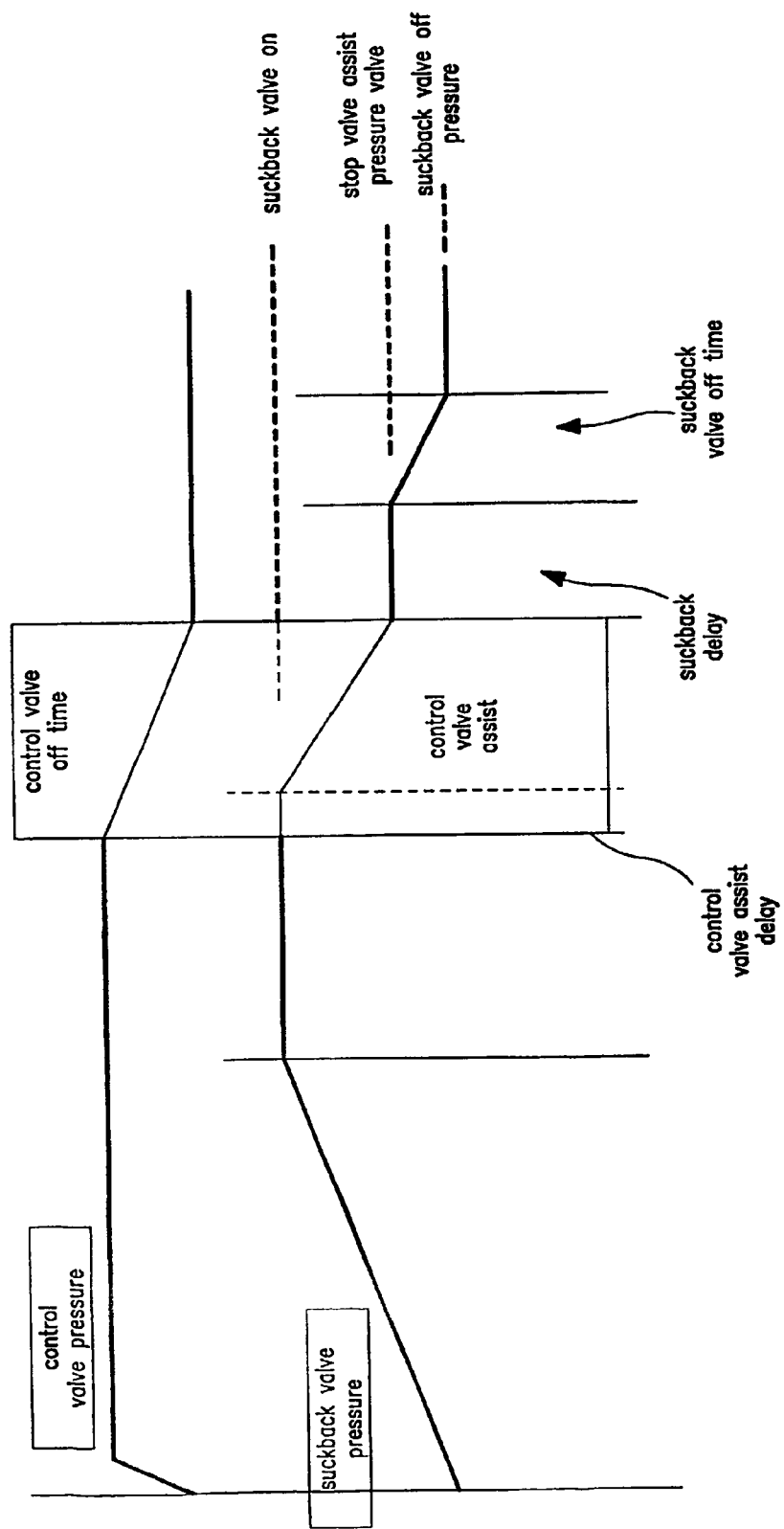
FIG. 29 is a timing/control diagram of the stop assist function in accordance with an embodiment of the present invention.

Various control parameters can be set to ensure proper operation of the suckback valve over a wide variety of applications. For example, suckback valve "off time" adjusts the time of the ON to OFF pressure transition. This is the time to move the valve diaphragm from it's fully extended position to the suckback position. Moving this too fast can cause the column of fluid to pull a bubble of air into the column or cavitate. Suckback valve "on time" adjusts the time of the OFF to ON pressure transition. This is the time necessary to move the end of the valve diaphragm from the suckback position to the fully extended position. Moving this too fast can cause the fluid column to "bulge", which can deleteriously change the actual dispense rate. There are two other settings: Suckback On and Off pressure settings. These two adjustments determine the distance that the valve will move creating the amount of suckback desired. The greater the difference in this pressure will increase the amount of suckback. Both On pressure and Off pressure are used for two reasons: to accommodate the differences in different valves of similar type; and to adjust for non-linearity in different valves and other system configurations. This entire action can also be delayed to separate the stop action of the control valve and suckback action. In some applications the suckback valve can be used to assist the control valve in the stopping action of the fluid with a separate suckback position actuated during the fluid stop action, as shown in FIG. 29. This assist function can also be programmed as a percentage of the stop action loaded as part of the beginning of stop or the ending of stop. The normal suckback position would then be used for suck back following a delay if programmed. Turning now to FIG. 2, housing 100 is shown containing the various components of the present invention. Preferably the electrical components, such as the LED board 105 and main printed circuit board 106, and the pneumatic proportional valve manifold 110, are isolated from the fluids, such as the frictional flow element 15 and the fluid control valve 10. Fluid enters the main fluid control valve 10 in a fluid inlet (not shown). The fluid is then directed through the valve and into the frictional flow element 15, which in the embodiment shown, includes a relatively short straight portion 15B that is then wound helically and terminates in another relatively longer straight portion 15A where the second pressure (and temperature) sensing occurs. The frictional flow element 15 can be a tube or conduit or a bundle of parallel hollow fiber tubes, for example, of sufficient dimensions to create a measurable pressure drop as the fluid flows therethrough. Other suitable frictional flow elements include a serpentine channel such as in a block of polymeric material, porous membranes, frits and filters. Preferably the frictional flow element avoids 90° turns that could promote clogging or excess turbulence which can cause shearing. Although the frictional flow element 15 can be straight, most preferably the frictional flow element 15 is a helical coil to save space, the diameter and length of which depend in part on the flow rate. Thus, the diameter and length of the frictional flow element 15 is a function of the pressure drop needed so that "noise" becomes negligible. For a given fluid, length of tube, and system conditions, the smaller the diameter of the tube, the larger the pressure drop. The pressure drop will increase as the viscosity of the fluid increases for a given tube geometry. For example, in the case of dispensing Deionized Water for a fluid control valve 10 sized for a frictional flow element 15 of ¼ inch OD tubing and wall thickness of about 0.047" at a length of about 40", a maximum flow rate of approximately 2 liters per minute can be produced depending also on system conditions, e.g., supply fluid pressure, supply pneumatic pressure, and system pressure drops external to the device. Flow ranges can be optimized for a given dispense/flow condition by simply changing the geometry of the frictional flow element 15. Preferably the internal diameter of the frictional flow element is the same or substantially the same as the internal diameter of tubing or other flow paths downstream of the element 15 in order to minimize or eliminate transition of fluid flowing out of the element 15. The flow through the frictional flow element 15 can be either laminar or turbulent flow. The fluid path is thus as follows: fluid enters the fluid inlet of the fluid control valve 10, flows through the valve (and past pressure and temperature sensors) and into the inlet of the frictional flow element 15, through the frictional flow element 15 and out the frictional flow element outlet (and past pressure and temperature sensors positioned upstream and downstream of the frictional flow element 15 outlet). The flexibility of the present design allows for easy interchangeability of the frictional flow element 15 in an embodiment of the present invention, based upon flow and/or fluid characteristics, for example.

Other types of devices used to generate pressure drop can result in unwanted side effects or are more suited to industrial processing applications. These negative effects include uncontrolled and excessive entrance and exit pressure losses, local regions of reverse flow or eddy currents, and trap zones. These alternate pressure drop elements include the Venturi tube, the flow nozzle, the orifice family (thin-plate square edged, quadrant edged, eccentric & segmental), centrifugal, and linear resistance.

The examples below demonstrate a set of frictional flow element specifications:
  A helical coil having an inside diameter 0.0625" which is 20 inches long and has 2.5 turns would typically flow water at room temperature between 0.5 cc/sec and 5 cc/sec.
  A helical coil having an inside diameter 0.156" which is 40 inches long and has 5.5 turns would typically flow water at room temperature between 1 cc/sec and 30 cc/sec.
  A helical coil having an inside diameter 0.250" which is 20 inches long and has 2.5 turns would typically flow water at room temperature between 0.5 lpm and 5 lpm.
  A helical coil having an inside diameter 0.375" which is 20 inches long and has 2.5 turns would typically flow water at room temperature between 2 lpm and 10 lpm.

Figure 3:
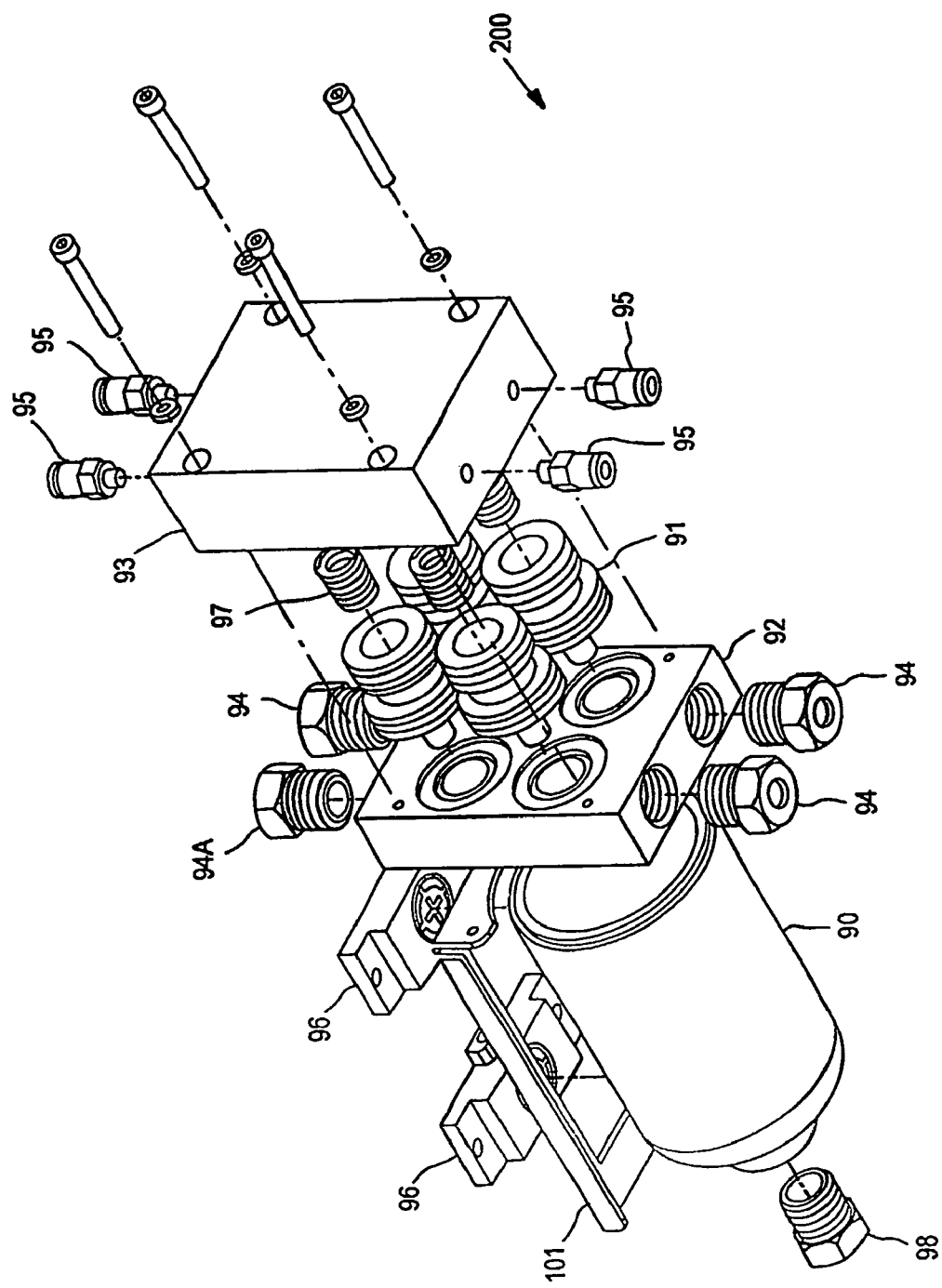
FIG. 3 is an exploded assembly diagram of an auxiliary input module in accordance with an embodiment of the present invention.

In certain applications the pressure of the fluid entering the fluid inlet 12 (FIGS. 1 and 8C) may be too low or too high. In order to regulate the fluid pressure, an auxiliary input module 200 as shown in FIG. 3 can be used upstream of the dispense module. The auxiliary input module 200 has a main body or reservoir 90 and four normally closed (due to the bias of springs 97) poppet valves 91 secured between module base 92 and cover 93. Four fluid fittings 94 and 94A are threaded to base 92 as shown. One fitting is a pressure port, another a vacuum port, another (94A) a fluid input and another a vent. Four push-on fittings 95 are secured to cover 93 and provide nitrogen to actuate poppet valves 91, which in turn will open flow to ports 94 and 94A. A fluid outlet 98 is provided at the bottom of main body 90 as shown. Level sensors 96 are secured to main body 90 with bracket 101 and sense the fluid level in the module main body or reservoir 90. A filter (not shown) can be provided in the main body 90.

To fill the module 200 with a pressurized fluid source, the inlet and vent valves can be opened substantially simultaneously, and pressurized fluid flows into the module 200 for a certain duration or until a certain fluid level is achieved, as sensed by the level sensor(s) 96. The vent valve can be used to equalize the pressure as the inlet valve allows fluid to enter the reservoir 90. The inlet and vent valves are then closed, the fluid supply pressure valve is opened, and the fluid control valve 10 is opened when fluid flow to the system is desired.

If the fluid pressure from the source is too low for proper operation, pressure can be applied following the fill cycle to boost the supply pressure. This can be applied continuously or only when required. Similarly, pressure can be applied where necessary when fluctuations in fluid supply pressure occur.

If a non-pressurized source is used, inlet and vacuum valves can be opened substantially simultaneously. The vacuum valve is used to draw fluid in from the fluid source.

The module 200 also can be used as a defoamer. Specifically, the fill portion of the cycle is as described above for a pressurized fluid source. Once the reservoir 90 is filled to the desired level, the inlet and vent are closed and vacuum is applied to the fluid for a user-programmable time or desired time, thereby removing bubbles therefrom.

In an alternative embodiment, where, for example, space reduction is a high priority, the valve shown in FIGS. 12-23 can be used. Like the valve of FIG. 8, the valve top cap 71' of FIG. 12 includes two concentric annular rings 84', 85' that define an annular groove therebetween for receiving a synthetic rubber O-ring 72' that with top pneumatic ring 74', seals the valve pneumatic diaphragm 73' in the housing. Opposite threaded valve buttons 76' sandwich valve top diaphragm 77' and valve bottom diaphragm 78', and are biased with spring 80'. The inner assembly is held together with the threaded buttons that thread to stainless steel screw, bolt or pin 75'. The outer assembly is held intact with valve bottom cap 82', stainless steel pins or bolts 83', and valve top cap 71'. Coupled to valve top cap 71' is a push-on fitting for pneumatic connection to the pneumatic proportional control valve 20 with suitable tubing or the like. The flow path in the fluid control valve 10 (for the inlet and outlet) is not inline to further minimize pressure drop and unswept volume as described in FIG. 27D. The offset flowpaths in and out of the valve allows slurry or other fluids to flow easily and with the least amount of accumulation.

The valve housing 70' is preferably a molded design, with the sensor housing(s) integral with the valve. Unlike the sensor housing 60 of FIG. 8, the integral embodiment requires only a single sensor end cap 65', significantly reducing the number of parts involved, and eliminating machining burrs that can cause catastrophic failures.

Figure 8E:
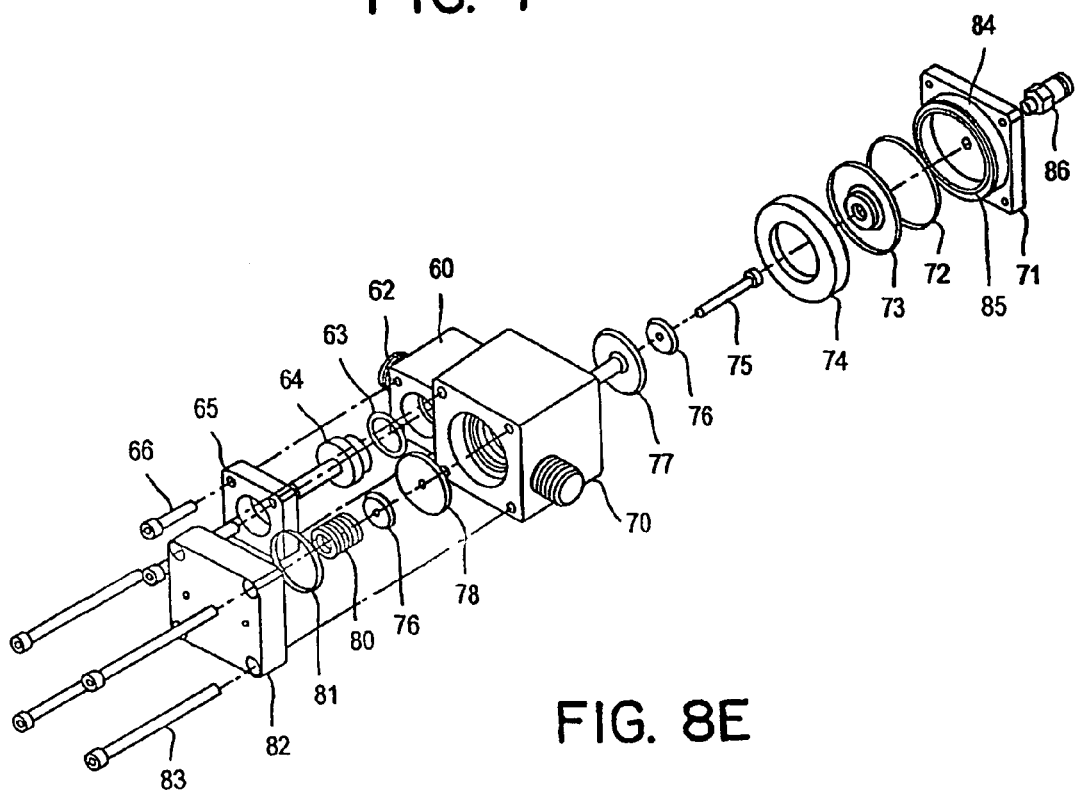
FIG. 8E is an exploded view of the proportional valve of FIG. 8A in accordance with an embodiment of the present invention.
Figure 8B:
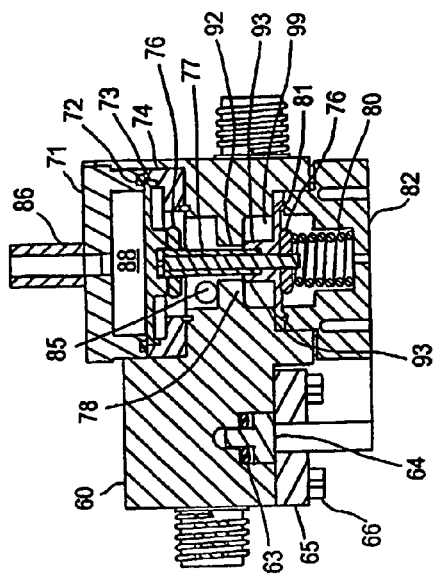
FIG. 8B is a cross-sectional view taken along line B-B of FIG. 8A.
Figure 8D:
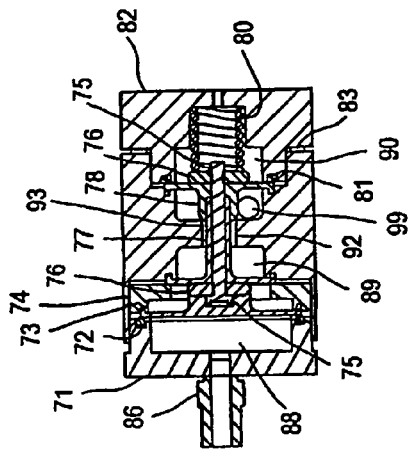
FIG. 8D is a cross-sectional view taken along line D-D of FIG. 8A.
Figure 8A:
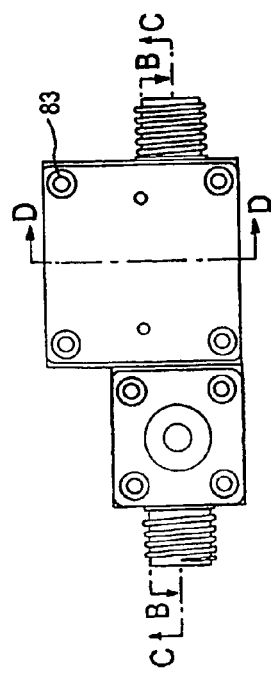
FIG. 8A is an end view of a proportional valve in accordance with an embodiment of the present invention.
Figure 8C:
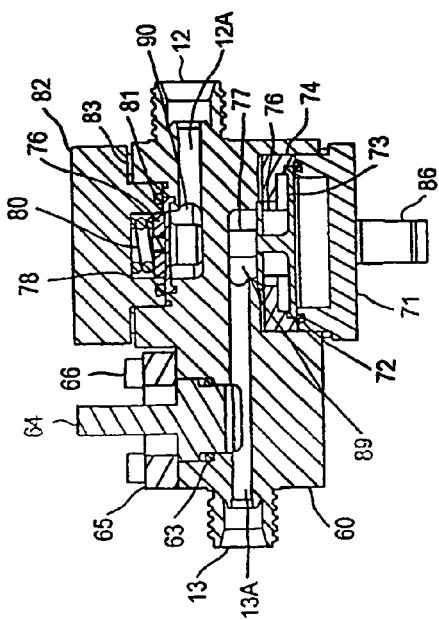
FIG. 8C is a cross-sectional view taken along line C-C of FIG. 8A.
Figure 12:
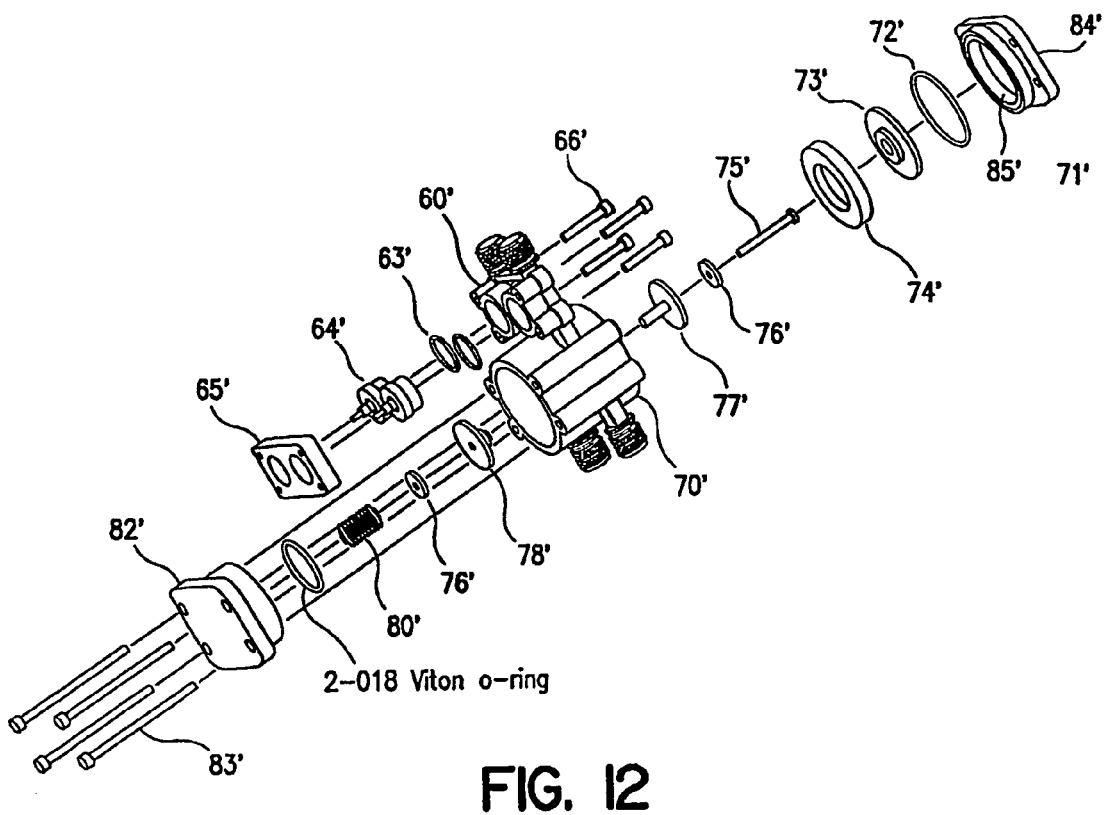
FIG. 12 is an exploded view of an alternative embodiment of the valve in accordance with the present invention.
Figure 13:
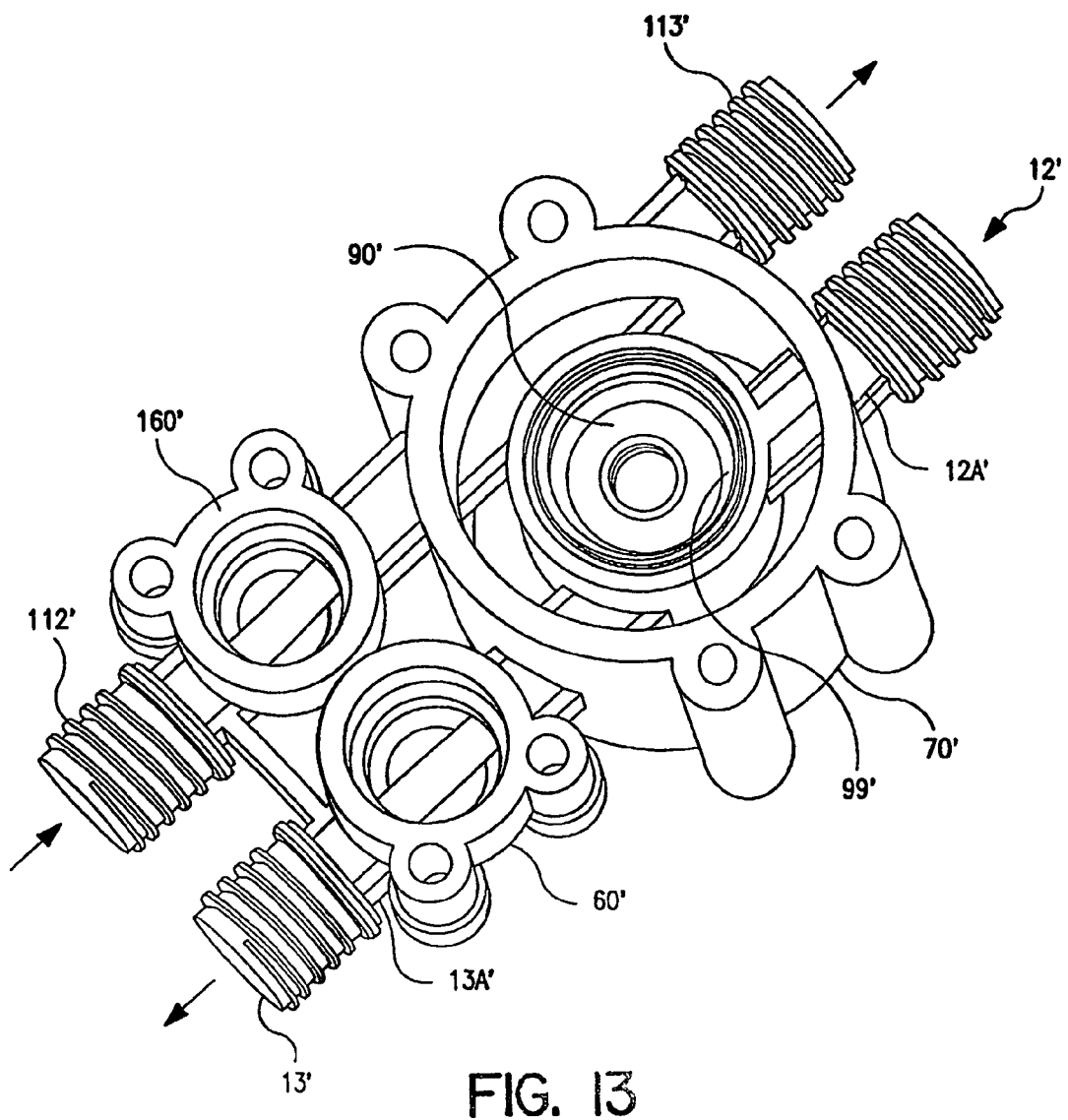
FIG. 13 is a perspective view of the integral valve and sensor housing of FIG. 12.

In the embodiment of the valve housing shown in FIGS. 12-14, fluid enters the inlet of the valve inlet 12' and flows in linear passageway 12A' until it reaches annular cavity 90' via inlet aperture 99' therein. The fluid tends to spiral around in cavity 90', once the valve is opened, and then flows into a narrow annular passageway past the two fluid diaphragms and into a second cavity as was the case with the previous embodiment as shown in FIGS. 8B and 8D. A spiraling fluid flow path towards the outlet 13' through an outlet aperture (not shown) via linear path 13A' is generated in the second cavity 89'. In order to improve the pressure loss between cavities 90' and 89' to optimize the sweeping action of the fluid in the device with the pressure drop generated, radiuses or chamfers (e.g., 0.04 inches) can be introduced to the sealing surfaces of the valve as before. Preferably the fluid inlet path 12A' and the fluid outlet path 13A' are located along the tangential (rather than through the center axis) of cavity 89' and 90', respectively, to assist the fluid in flowing uniformly and to improve pressure drop. Inlet 12' and outlet 13' can have external threads as shown, for convenient coupling to suitable hosing, for example.

Positioned in flow path 13A' downstream of the first and second cavities 90' and 89' is a first sensor housing 60'. The sensor housing 60' is in fluid communication with the second cavity 89' and with outlet 13'. Pressure and/or temperature sensors 64' are sealed in the housing 60' such as with a perfluoroelastomer (KALREZ) O-ring 63'. End cap 65' is coupled to housing 60' such as with a plurality of bolts or pins 66' as shown. The sensor(s) 64' sense pressure and/or temperature in the fluid path between the inlet and outlet of the sensor housing 60', and send a signal indicative of the sensed values to a controller.

This embodiment of the valve also includes a second sensor housing 160', which is preferably identical in construction to sensor housing 60'. The second sensor housing 60' is in fluid communication with inlet 112' and outlet 113' spaced from inlet 112' as shown in FIG. 13.

Figure 14A:
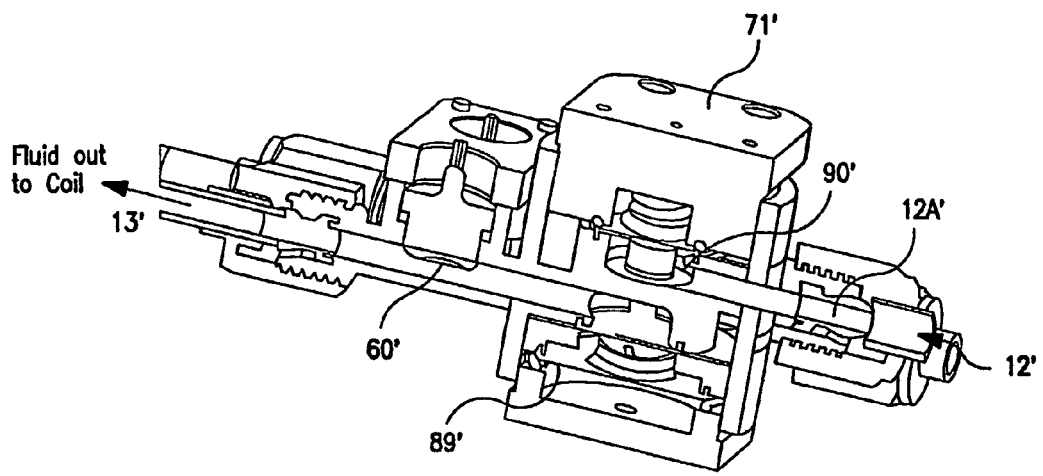
FIG. 14A is a perspective view, in cross-section, of the fluid inlet side of the valve of FIG. 12.
Figure 14B:
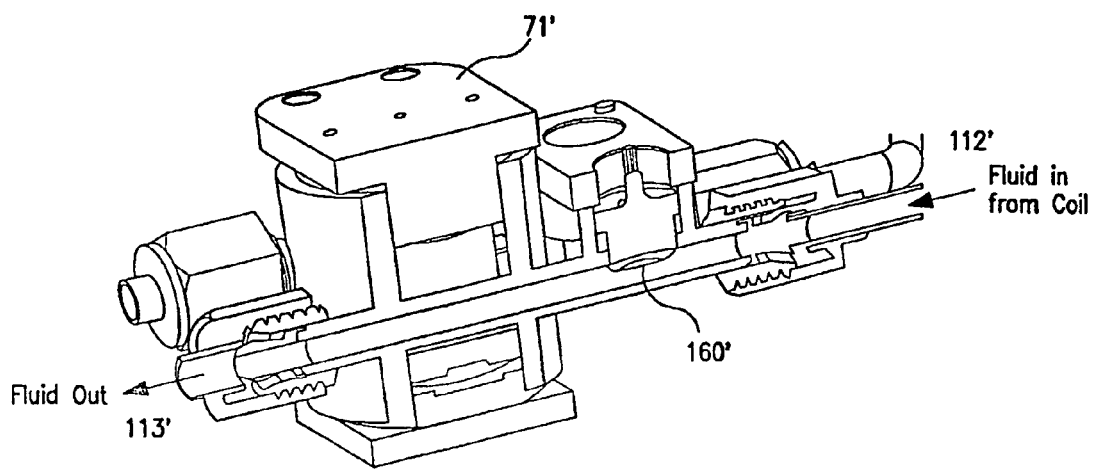
FIG. 14B is a perspective view, in cross-section, of the fluid outlet side of the valve of FIG. 12.

Accordingly, the valve of this embodiment functions as follows, with particular reference to FIGS. 14A and 14B. The fluid inlet flow to the valve enters inlet 12' and flows through passageway 12A' to the first valve cavity 90' where the fluid is contained until the valve is opened. Once the valve is opened, the fluid flows from the first valve cavity 90' through an aperture to the second valve cavity 89'. From the second valve cavity 89', the fluid exits via an outlet aperture and enters the first sensor housing 60' where the pressure and/or temperature of the fluid is sensed and recorded and/or transmitted to the controller. The fluid exits the valve assembly through outlet 13' and passes through a frictional flow element, preferably a coiled tube (not shown), and then re-enters the valve assembly via inlet 112' as shown in FIG. 14B. The fluid flows to second sensor housing 160', where the pressure and/or temperature is again sensed and recorded and/or transmitted to the controller. After exiting the second sensor housing 160', the fluid passes through the valve assembly through a carefully positioned flow path to optimize the usage of space, and returns to the same face of the device where it originally entered.

Figure 15:
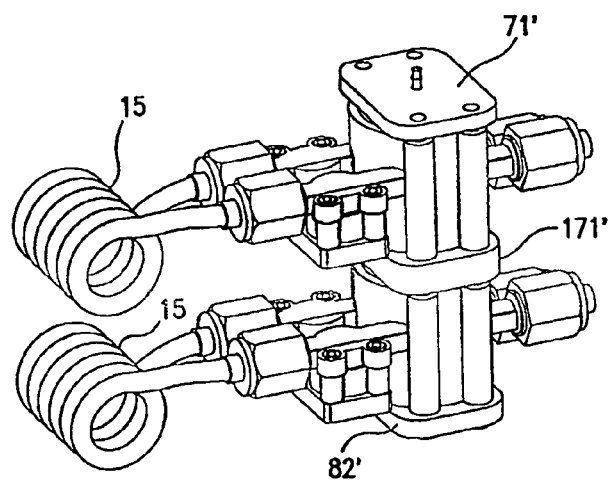
FIG. 15 is a perspective view of a stacked valve unit of the valve of FIG. 12.

By designing the valve assembly to have the pneumatic features on one side and the valve mechanical features on the other side, multiple valve assemblies can be stacked into a single unit, further reducing space occupancy as well as cost. Thus, as shown in FIG. 13, sensor housings 60' and 160' are equally sized and configured, and the sensor housing 60' is spaced from outlet 113' the same distance that the sensor housing 160' is spaced from inlet 112'. Accordingly, if two such valve bodies are vertically stacked, the valve cavities will be vertically aligned, and the sensor housings will be vertically aligned. One example of such a stackable valve assembly is illustrated in FIG. 15, where the middle cover 171' is designed to have internal detail of both the top cap 71' and the bottom cap 82' in order to accept the pneumatic side components and the mechanical side components of the valve. The stackable valve embodiment is particularly useful for multiple points of dispense where space constraints exist. Additional advantages include elimination of part duplication, as only a single proportional manifold is required, only a single LED and main PC board is required, only a single casing and cable set is required, and only a single set of nitrogen supply lines and fittings is required. Applications include chemical mixing (ratio-metric control), synchronized dispense of separate fluids, independent dispense to two separate points of dispense, integrated independent or dependent control, and continuous uninterrupted dispense.

Figure 16:
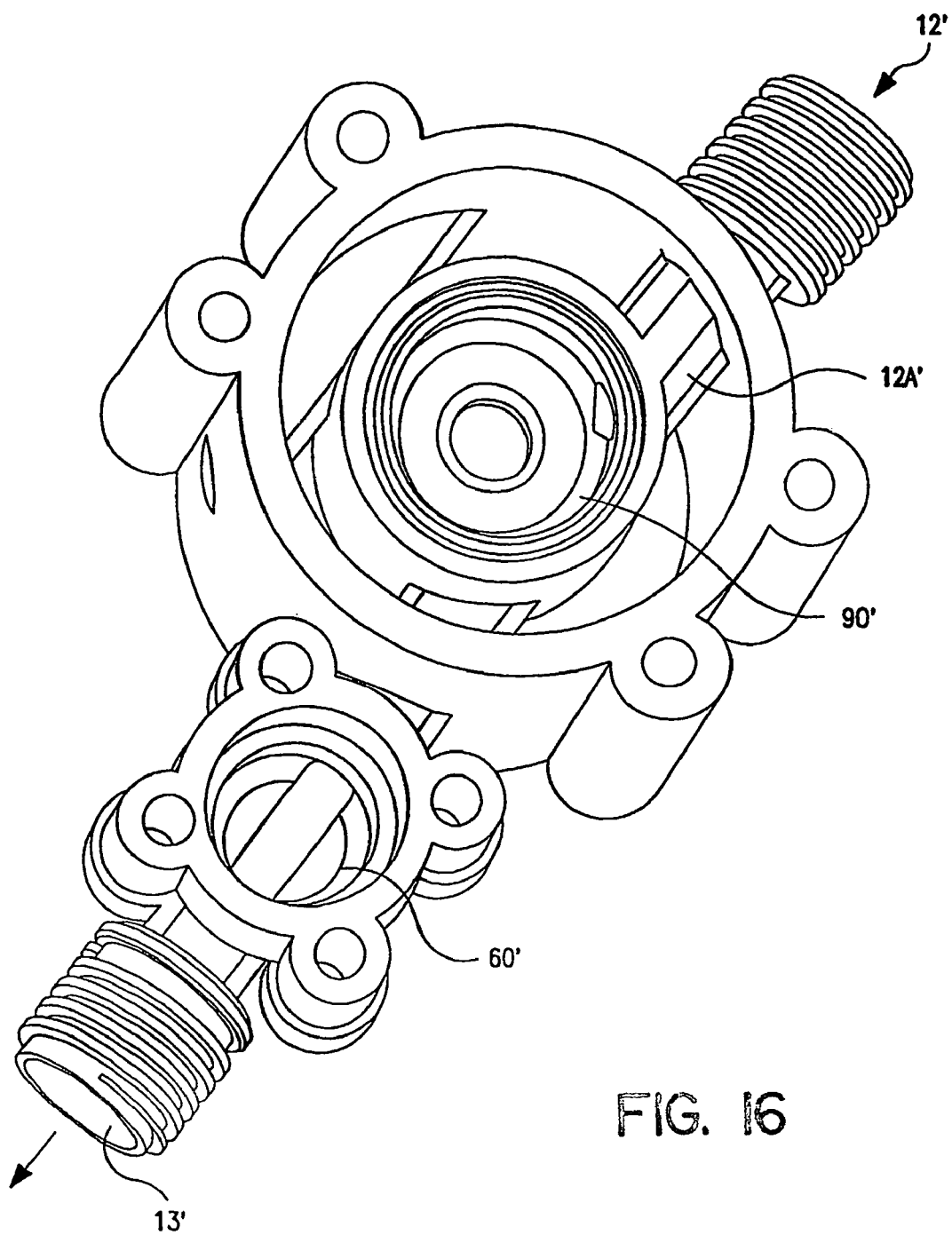
FIG. 16 is a perspective view of a valve with a single sensor housing in accordance with an embodiment of the present invention.

The convenient design of the valve assembly enables substantial versatility. For example, FIG. 16 shows an assembly having a valve and a single sensor housing. The sizing of the various components of the valve is preferably consistent with the valve of FIG. 13, to maintain stackability if desired, and to allow for an additional sensor housing, such as that shown in FIG. 18, to be added if desired. Indeed, by providing removable sensor housing inserts of FIG. 18 as separate components, devices with one or more sensor housings can be constructed wherein the sensor housings are placed upside-down (relative to the valve cavity) to assist in facilitating bubble removal.

Figure 17:
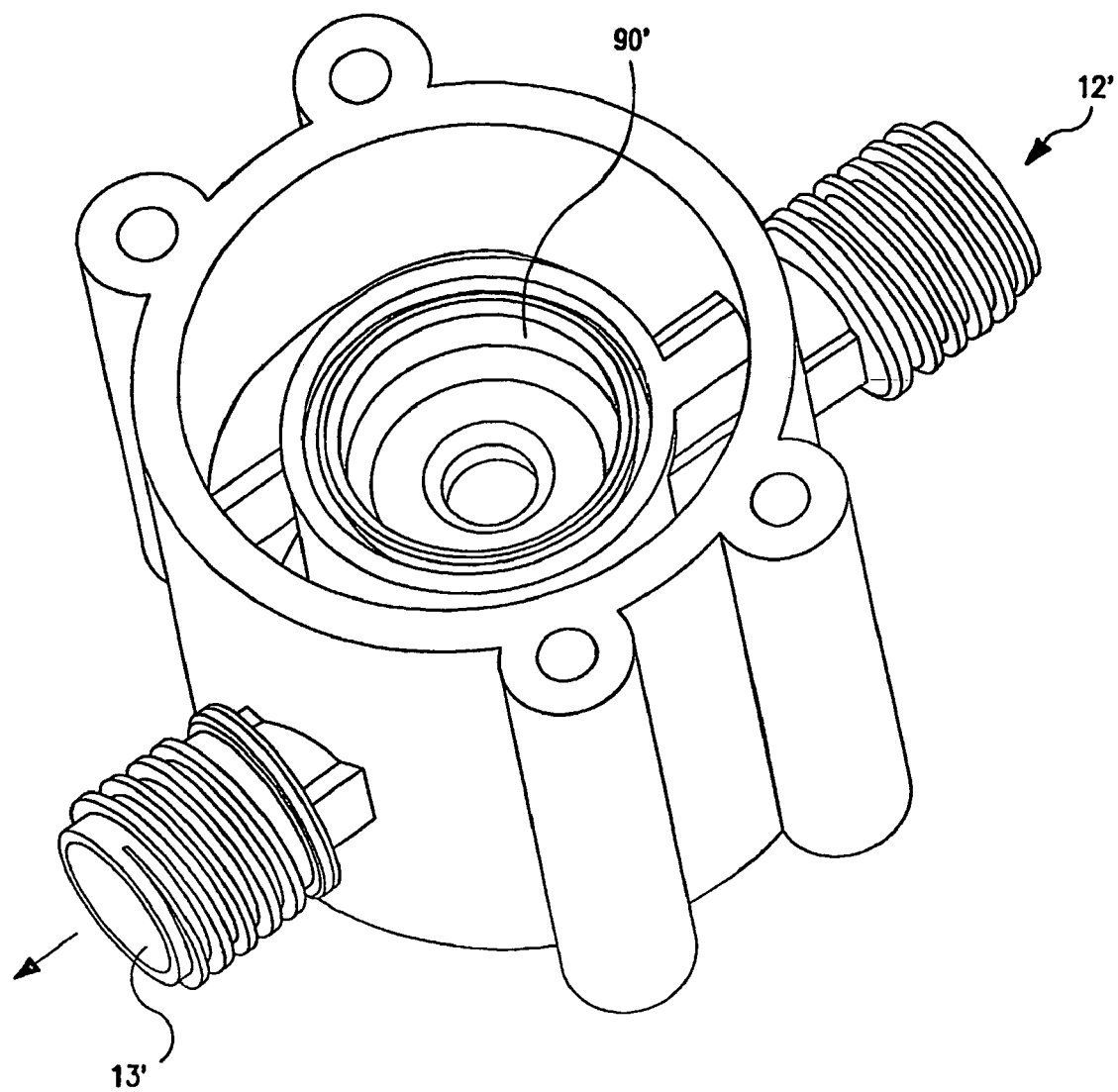
FIG. 17 is a perspective view of a valve with no sensor housing in accordance with an embodiment of the present invention.
Figure 18:
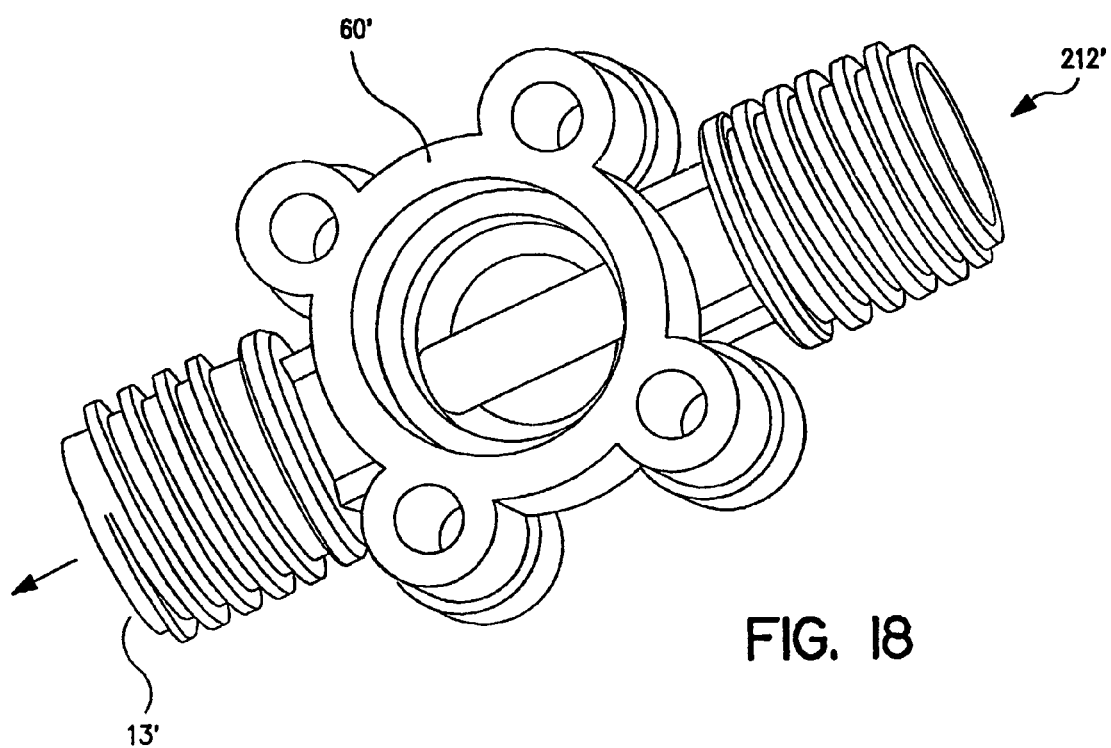
FIG. 18 is a perspective view of a single sensor housing in accordance with an embodiment of the present invention.
Figure 19:
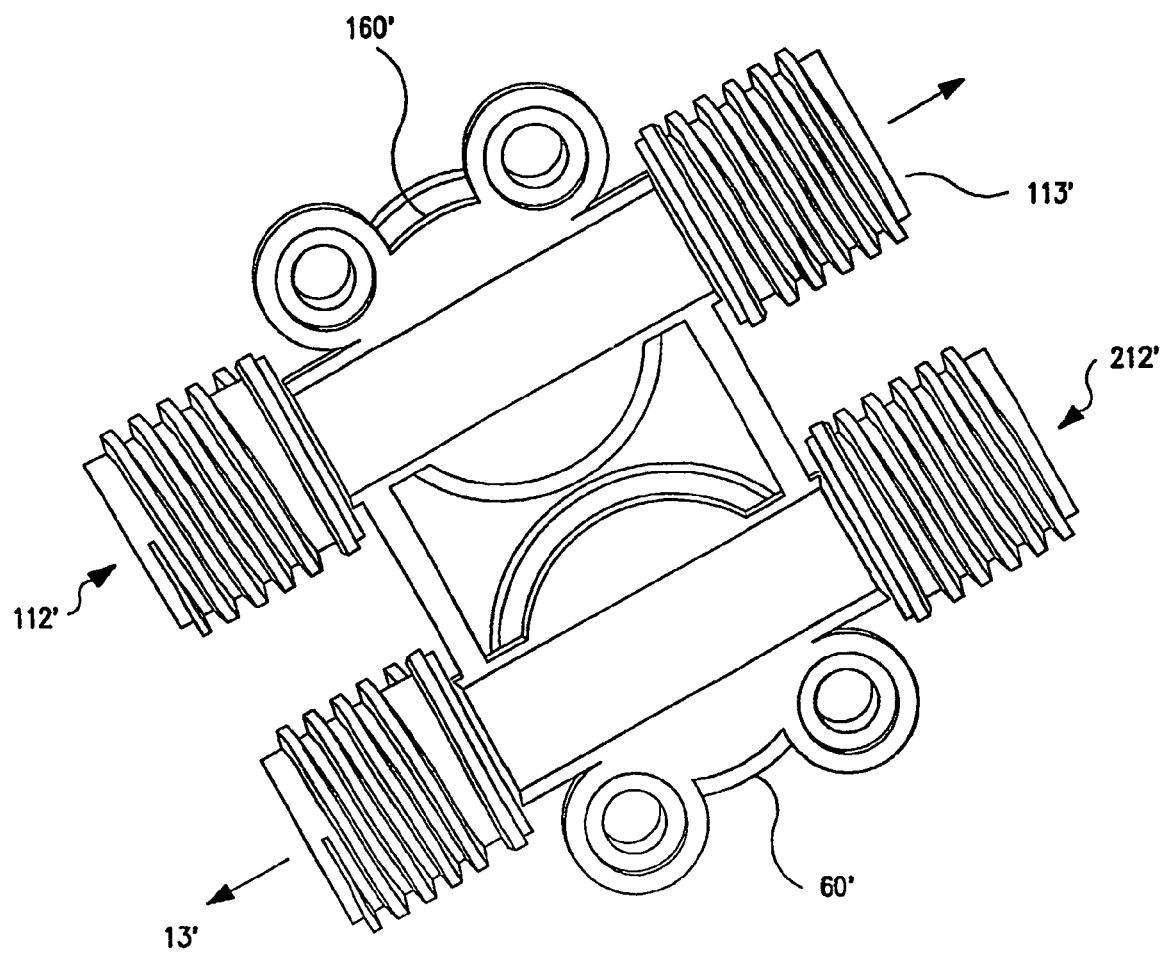
FIG. 19 is a perspective view of a dual sensor housing in accordance with an embodiment of the present invention.
Figure 23A:
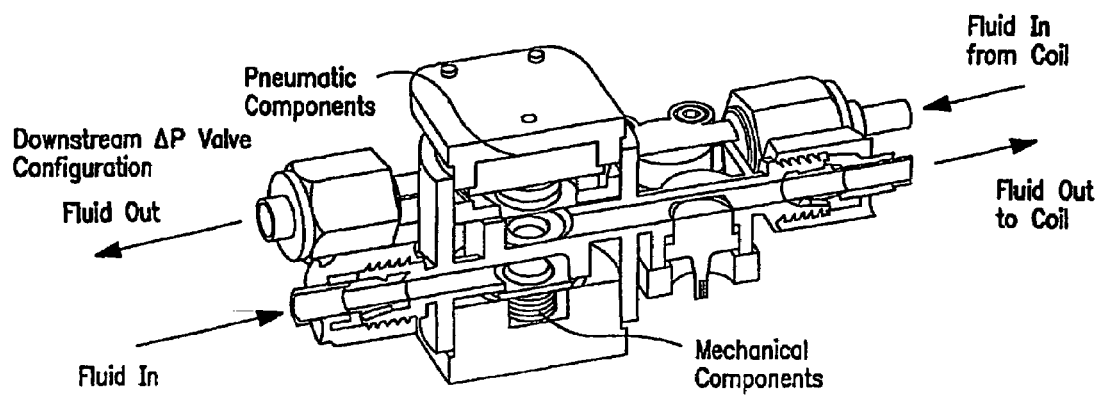
FIG. 23A is a perspective view, in cross-section, of a valve in a downstream pressure differential configuration in accordance with an embodiment of the present invention.
Figure 23B:
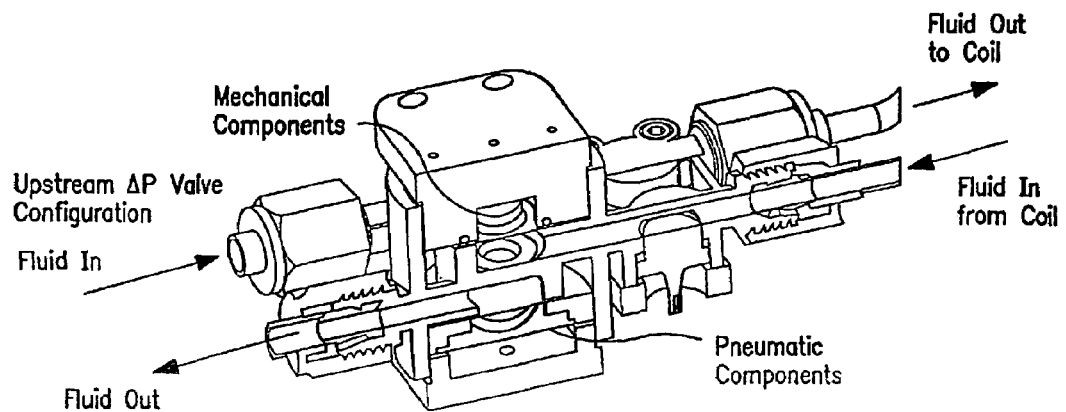
FIG. 23B is a perspective view, in cross-section, of a valve in an upstream pressure differential configuration in accordance with an embodiment of the present invention.

The various components can be formed as molded inserts. For example, FIG. 17 shows a valve having no sensor housings. FIG. 19 illustrates a double sensor housing insert. The inlets 112', 212' and outlets 13', 113' of the sensor housing are formed with external threads for easy attachment to the valve. The inserts for the sensor housing portions of the valve assembly enable many different assembly configurations, and are able to be replaced with inserts to mold the sensor housings upside-down to help facilitate bubble removal depending upon the orientation of the valve when it is installed, as discussed above. Similarly, the interchangeability of the pneumatic and mechanical components allows the inlet and outlet of the molded valve to be reversed for upstream or downstream pressure control. By installing the pneumatic and mechanical components in the opposite ends of the valve cavity, the differential pressure of the system can run in reverse and the differential pressures upstream of the valve can be recorded instead of the pressures downstream. This allows the user to monitor the supply pressure to the system unit instead of the pressure downstream closer to the dispense point. The downstream configuration and upstream configuration are illustrated in FIGS. 23A and 23B, respectively. These figures illustrate the versatility of the molded valve design in that the pneumatic components and the mechanical components can be installed into either side of the valve depending on whether a pressure drop upstream or downstream of the valve is desired. The location of the sensors also provides a monitor of the customer's system conditions, not just the conditions of the instant device.

Figure 24A:
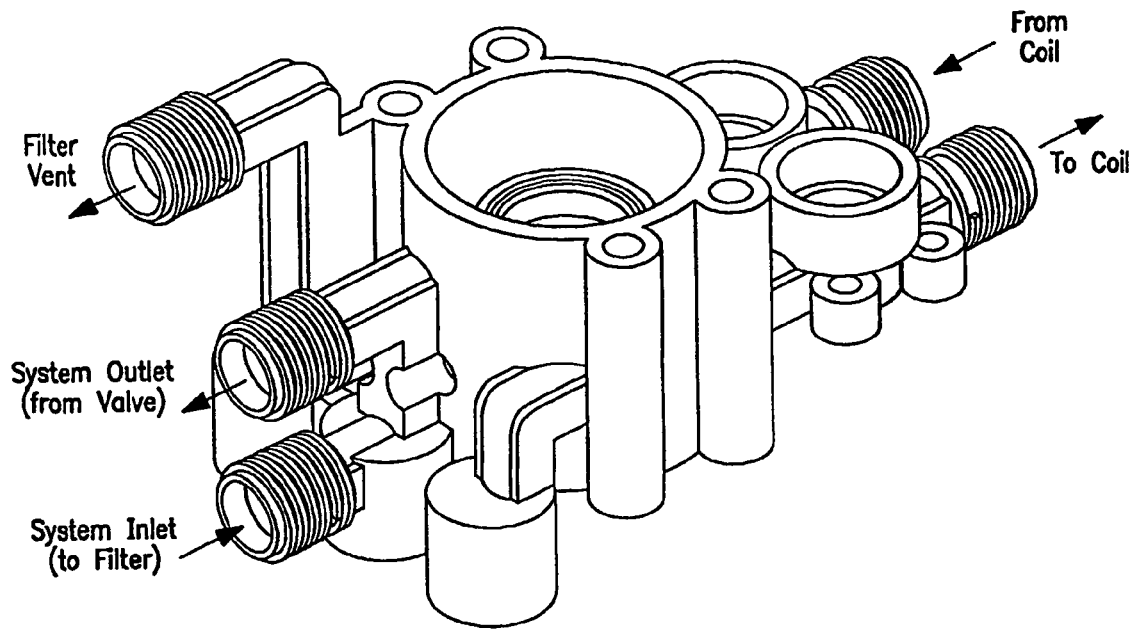
FIGS. 24A and 24B are perspective views of a valve in accordance with another embodiment of the present invention.
Figure 24B:
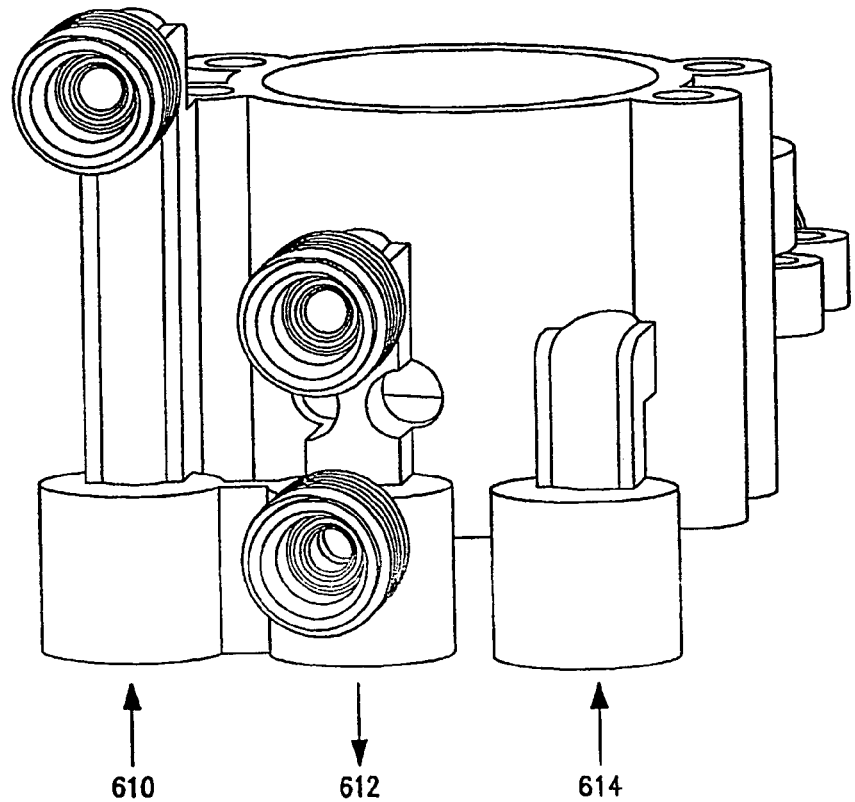

FIGS. 24A and 24B illustrate a molded component configured for a flow controller with the ability to mate with a Mykrolis LHVD style filter through the three ports located on the bottom of the device (vent, inlet and outlet ports). This design is capable of accepting an LHVD style filtering device.

A conventional bubble sensor can be used in the present invention. A bubble sensor sends a modulated signal to a controller which translates it into a percentage of air. If the percentage exceeds a predetermined level, the user can be notified. Suitable bubble sensors can be photosensitive or capacitive, and have a binary output (on and off), whereby the number of ons and offs are counted and converted to a percentage of air in a slug of fluid over time.

Figure 25A:
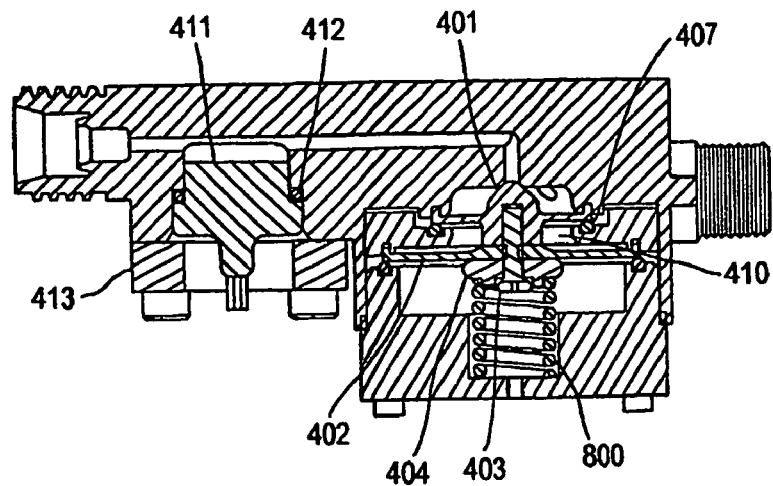
FIGS. 25A and 25B are cross-sectional views of a valve in accordance with a still further embodiment of the present invention.
Figure 25B:
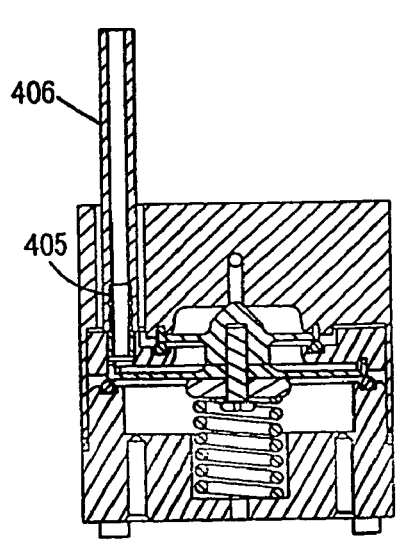

FIGS. 25A and 25B illustrate a valve design with no bubble trap locations. The fluid enters through the inlet of the valve and then flows straight up along with all bubbles that also rise to the top. The remainder of the flow path is a continuous diameter path with the sensor pocket detail all below the path so that no air can be trapped (conventional valves have features that create pockets where gas cannot escape). This design also eliminates three parts compared to the previous embodiments, including a fluid diaphragm, a valve cap and a button, to reduce assembly cost, part cost and complexity. Two critical fluid seal locations also are eliminated, including one of the diaphragm tongue and groove seals as well as the interference fit between two fluid diaphragms.

The valve functions by applying pneumatic pressure between the fluid diaphragm 401 and the pneumatic diaphragm 402 to drive the valve open against a pre-loaded compression spring 800 biasing the valve closed. Because the pneumatic diaphragm 402 is larger than the fluid diaphragm 401 and the two diaphragms are constrained to each other with screw 403 and button 404, the pressure will create a greater load on the pneumatic diaphragm 402 and force the valve open. Pressure is supplied through barb fitting 405 (FIG. 25B) and tubing (e.g., polyethylene) 406. The pneumatic pressure cavity 410 is sealed with O-ring 407 and pneumatic diaphragm tongue and groove as shown. A sensor 411 sealed with O-ring 412 and secured with a sensor cap 413.

Figure 26:
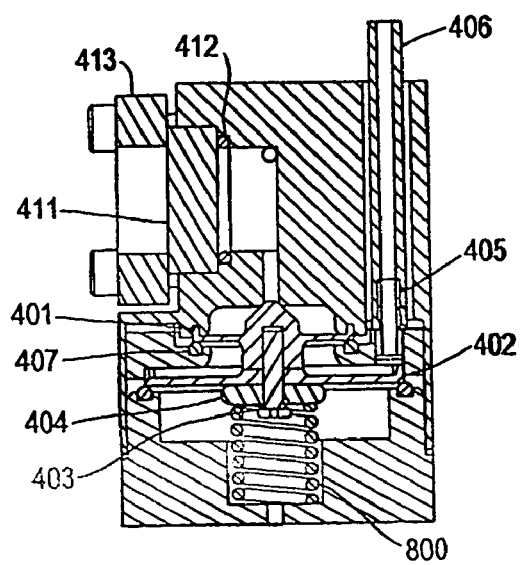
FIG. 26 is a cross-sectional view of a valve in accordance with yet another embodiment of the present invention.
Figure 27B:
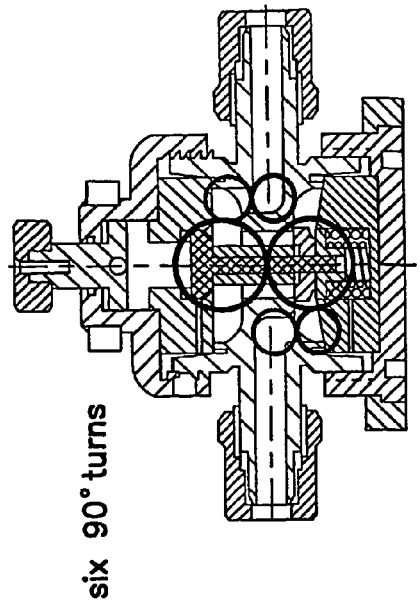
FIGS. 27A-C are several cross-sectional views of commercially available valves similar to the fluid control valve of the present invention.
Figure 27D:
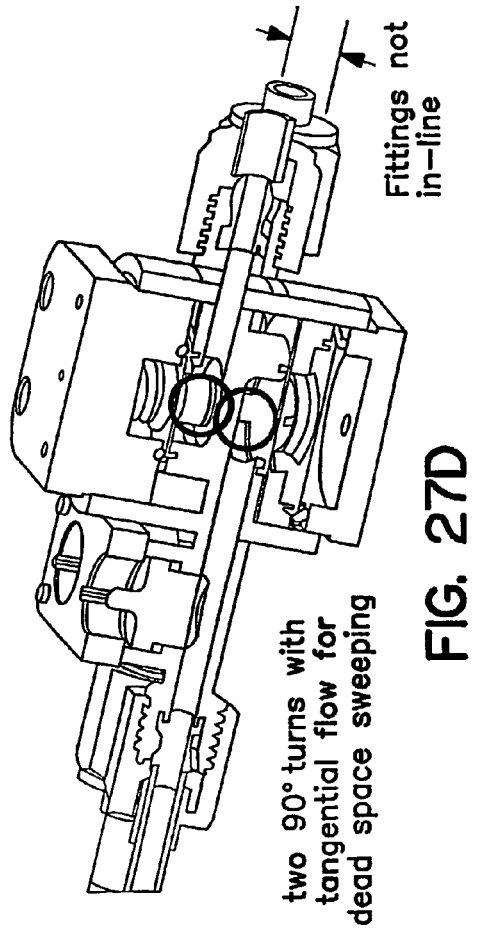
FIG. 27D is a cross-sectional view of an embodiment of the present invention.
Figure 27A:
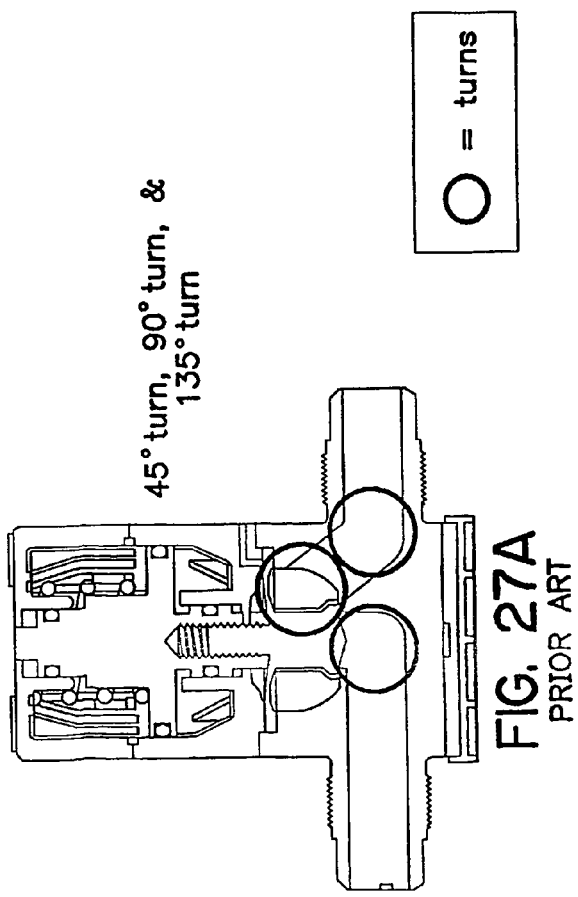
Figure 27C:
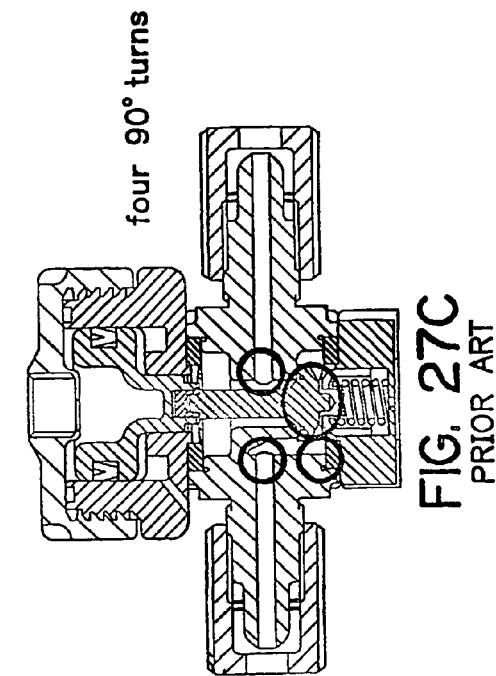

In another embodiment, to reduce 90° turns, the design can be modified as shown in FIG. 26, where the sensor cavity is moved to the side of the valve. Offset flow paths eliminates turns, and eliminates un-swept areas. The valve exhibits low hysteresis in view of the absence of O-rings on the pneumatic side, and the design and sizing of the diaphragms with respect to each other. In view of the poppet design, excellent linearity is also achieved; the fluid flow rate is substantially directly proportional to the pressure applied to the valve throughout its working operation.

Figure 28B:
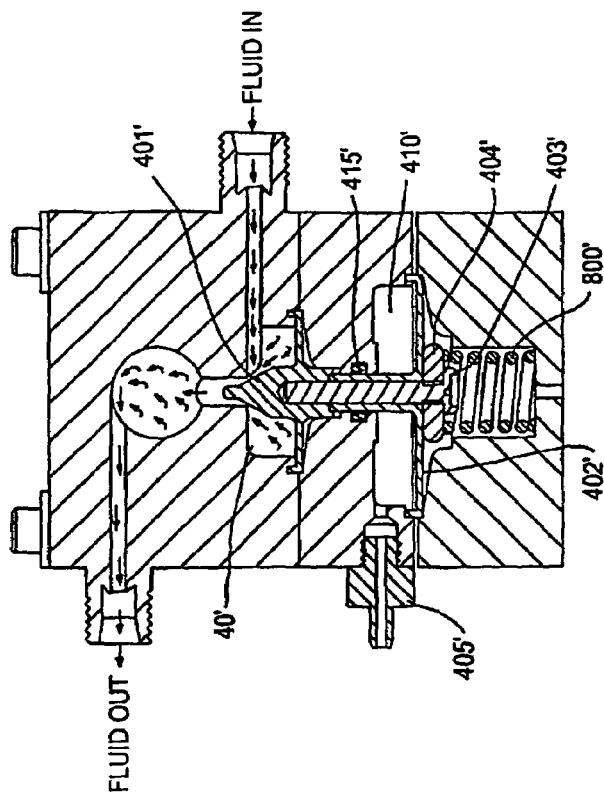
FIGS. 28A and 28B are cross-sectional views of a valve in the closed and partially open positions in accordance with another embodiment of the present invention.
Figure 28A:
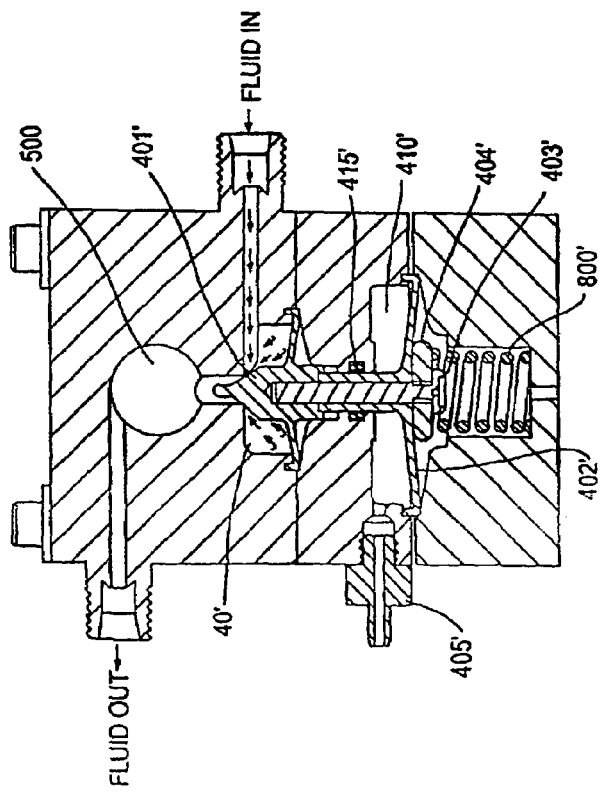

FIGS. 28A and 28B show another embodiment of the fluid control valve where an O-ring separates the fluid diaphragm from the pneumatic diaphragm. This prevents excess loading on the two diaphragms that will cause a lower valve life expectancy. The flowpath of the fluid control valve is maintained with no high points for air to get trapped (except for a minuscule amount that can collect where the sensor seals on the side of the fluid control valve body). The fluid control valve flowpath is designed with a single fluid diaphragm and no high points within the valve (not including the pressure sensor sealing method) that are not directly in the fluid flow path where air could normally get trapped. Air trapped within the fluid control valve can be deleterious to the end of dispense once the fluid control valve closes and the air is able to decompress. The start of dispense can also be adversely affected by air trapped in the fluid control valve. Air trapped in the fluid control valve may also contribute to additional air being dissolved into the fluid or micro-bubble formations that can cause defects on the wafer.

The valve functions by applying pneumatic pressure to the pneumatic cavity 410' between pneumatic diaphragm 402' and the pneumatic seal O-ring 415' to drive the valve open against the pre-loaded compression spring 800' biasing the valve closed. The pressure applied to the surface area of pneumatic diaphragm 402' causes it to deflect forcing fluid diaphragm 401' to also deflect and open as it is constrained to pneumatic diaphragm 402' with screw 403' and button 404'. The pneumatic seal O-ring 415' prevents pneumatic pressure from generating excess load on the two diaphragms by not allowing any pneumatic pressure to reach the fluid diaphragm. Pressure is applied through barb fitting 405' and suitable tubing. A sensor cavity 500 optionally may be located above the valve seal. The design prevents air from becoming trapped in the fluid cavity, the inlet channel, the outlet channel, and the channel to the sensor cavity and the sensor cavity (if present). The fluid inlet channel is positioned tangent to the internal diameter of the valve fluid cavity 90', as tangential flow prevents unswept areas. All high spots are within the fluid path, or are not higher than the fluid path. No sharp flow path corners are present. Fluid flow is gentle.

Figure 20:
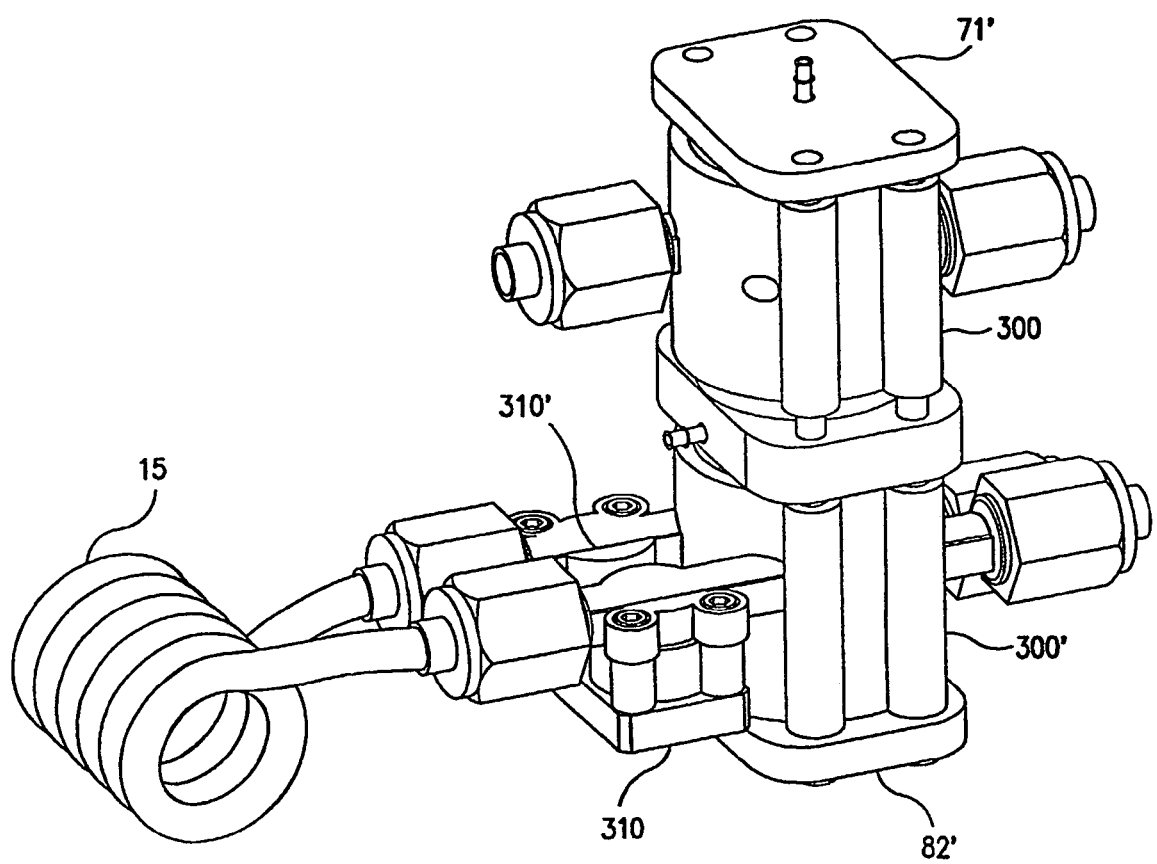
FIG. 20 is a perspective view of a flow controller and on/off valve assembly in accordance with an embodiment of the present invention.
Figure 21:
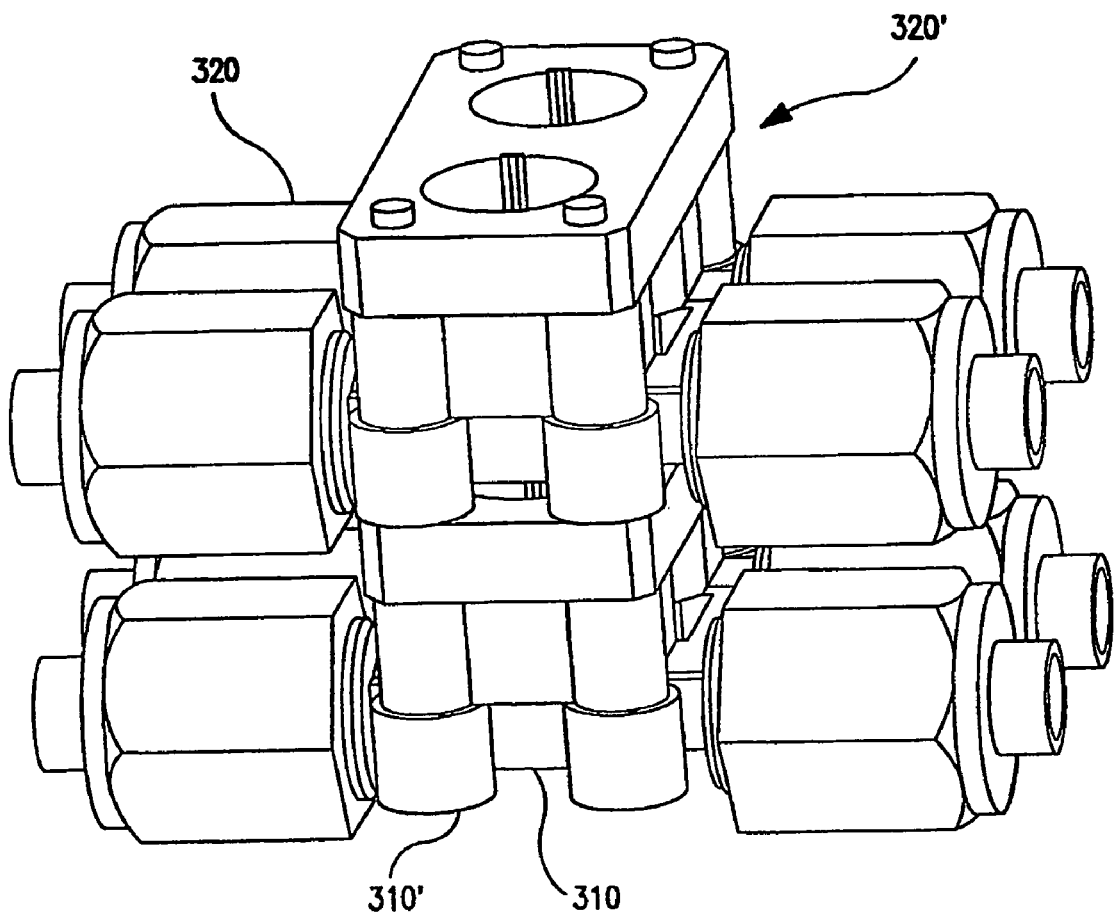
FIG. 21 is a perspective view of a sensing device in accordance with an embodiment of the present invention.
Figure 22:
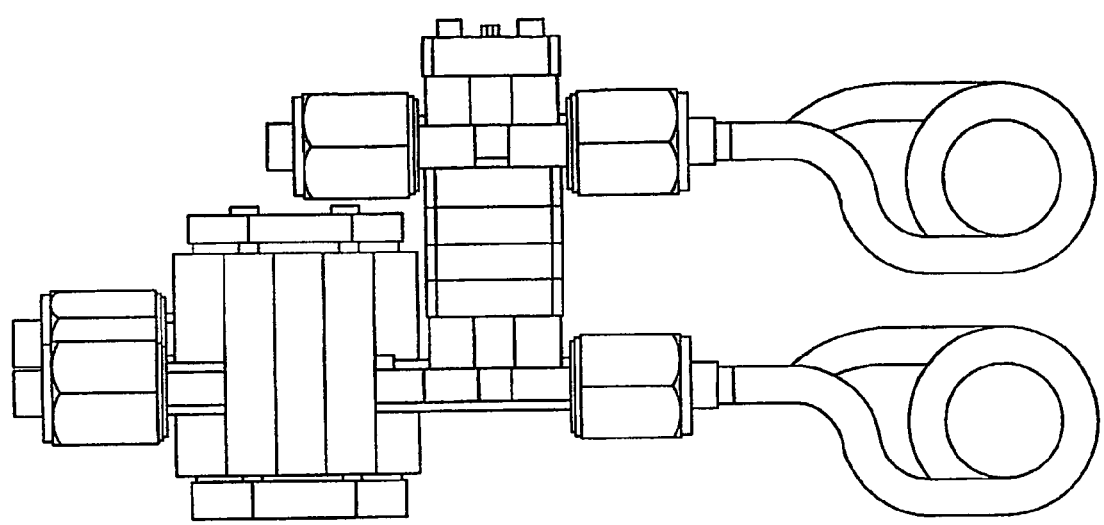
FIG. 22 is a perspective view of a flow controller and flowmeter assembly in accordance with an embodiment of the present invention.

The various designs and flexibility thereof allow for modular assemblies with numerous combinations of valves and sensors and provide for various configurations, enabling the construction of valves, sensing devices, flow meters, flow controllers, pressure controllers and temperature controllers. Thus, FIG. 20 shows a stacked flow controller and on/off valve assembly including a first valve 300, a second valve 300' and first and second sensors 310, 310' in fluid communication with a frictional flow element 15. FIG. 21 shows a stacked assembly of four sensing devices 310, 310', 320 and 320'. FIG. 22 illustrates a flow controller and flow meter assembly.

FIGS. 24A, 24B illustrate a further embodiment of the molded valve design that is configured for a flow controller and has the ability to mate with an LHVD (low hold-up volume device) style filter device through three ports located on the bottom of the device. Port 610 is a vent from the filter, port 612 is an inlet to the filter, and port 614 is an outlet from the filter.

In accordance with a further embodiment of the present invention, a valve assist function can be used. In conventional valves using solenoids, needle valves can be used to alter the change in pressure applied to each valve, typically to dissipate that pressure slowly. By reducing the rate of change applied to the suckback portion of the valve during the stop portion of the sequence, the suckback valve assists the stop valve. In accordance with the present invention as shown in FIG. 29, during the control valve (or stop valve) off time, the suckback valve pressure can be reduced as shown to assist the control valve. Once the control valve off time is terminated, a suckback delay is provided where the pressure to the suckback valve remains constant. After this predetermined delay, the pressure applied to the suckback valve is again reduced until the suckback valve pressure reaches a predetermined level, returning the suckback valve to its normal or static position. This sequence helps in keeping fluid drops from hanging off the nozzle. In yet a further embodiment, the suckback assist action can be delayed to start at a time following the control valve action, or can be shortened so that the action of the suckback valve occurs at only the beginning of the stop action of the control valve. Although the foregoing recites pressure as the actuation method, it is within the scope of the present invention to use any valve actuation method, such as a motor.

EXAMPLE 1

Figure 10:
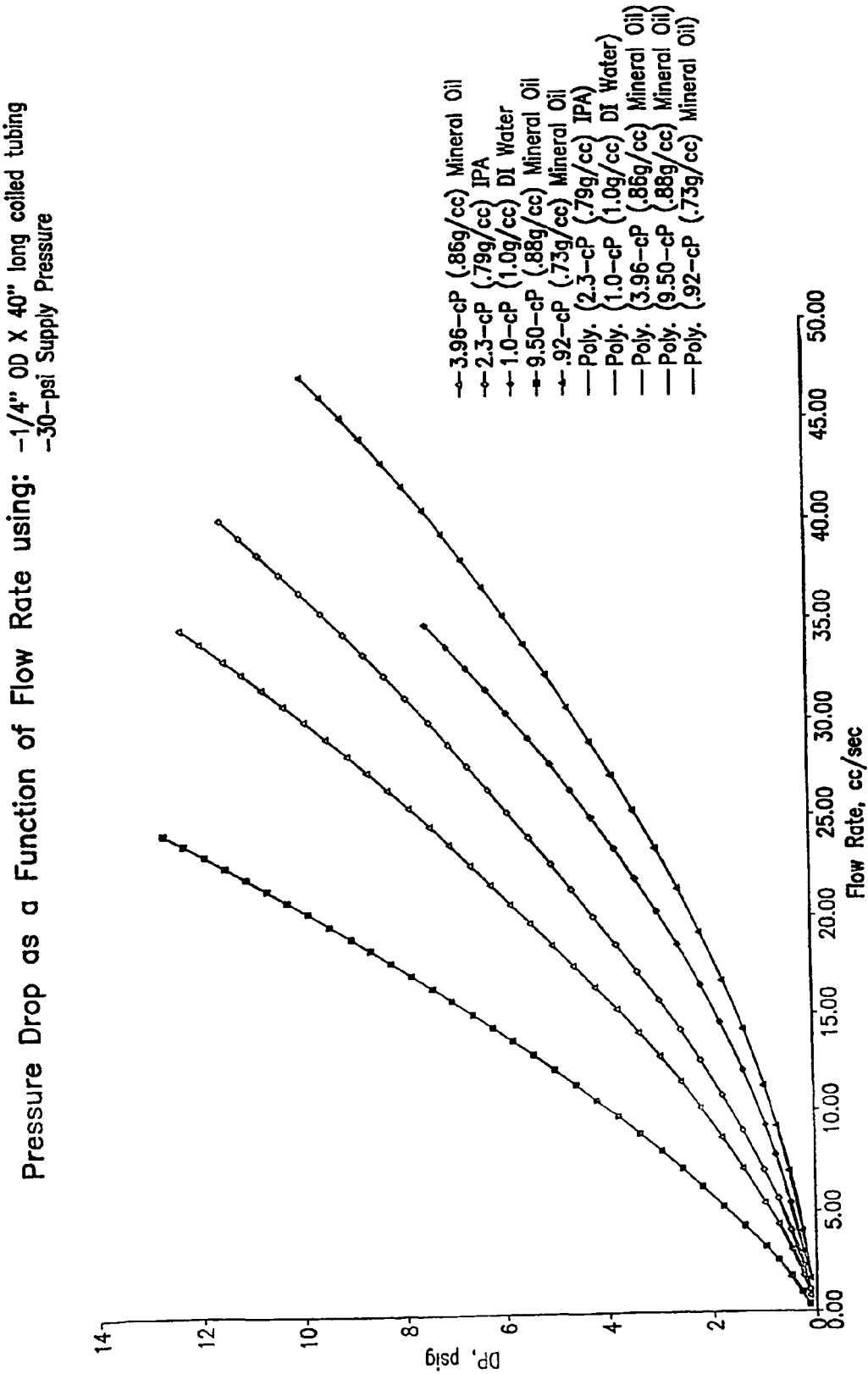
FIG. 10 is a graph of pressure drop versus flow rate for five different viscosities.

The system was set up so that a known differential pressure and a fixed dispense time could be inputted to the controller, and a dispense could be subsequently triggered from a laptop computer. The resultant output flow of deionized water was captured in a container and weighed using a precision scale to determine its mass. Using the mass of each dispense combined with the known density of the fluid material, the volume of each dispense was calculated. Combining the volume dispensed with the known dispense time resulted in a flow rate determination. Five different viscosities were checked, ranging from about 0.92 to about 9.5 centipoise. The results are shown graphically in FIG. 10.

EXAMPLE 2

Three different valves were tested for hysteresis, including two commercially available valves, and the valve of the present invention shown in FIGS. 8A-8D. The valve actuation pressure was varied up and down and the pressure inside the test system was measured in steps up and down through the valve actuation pressure range and plotted as voltage. More specifically, the test set-up was a closed system of the valve and downstream pressure sensor, with the valve under constant pressure and the pressure sensor monitoring the change in pressure downstream of the valve as the valve moved through its range of closed to full open and back again to closed.

Figure 9A:
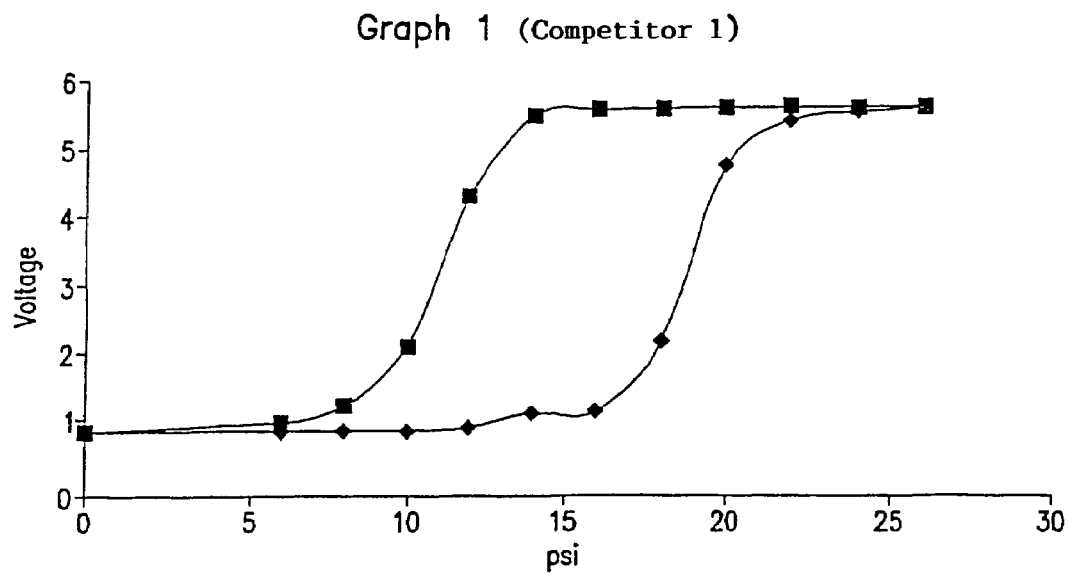
FIG. 9A is a graph of the hysteresis of a conventional Furon valve.
Figure 9B:
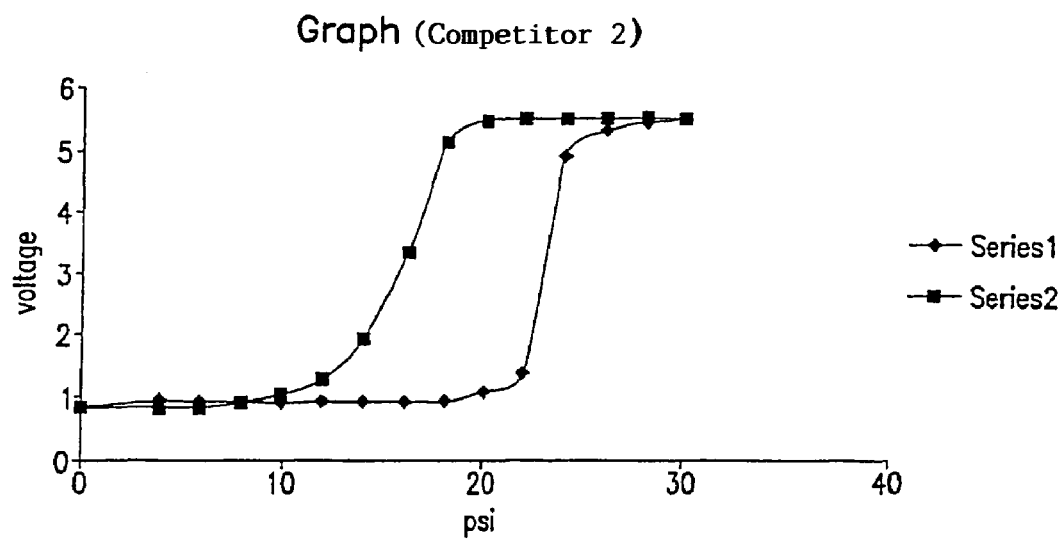
FIG. 9B is a graph of the hysteresis of a conventional SMC valve.
Figure 9C:
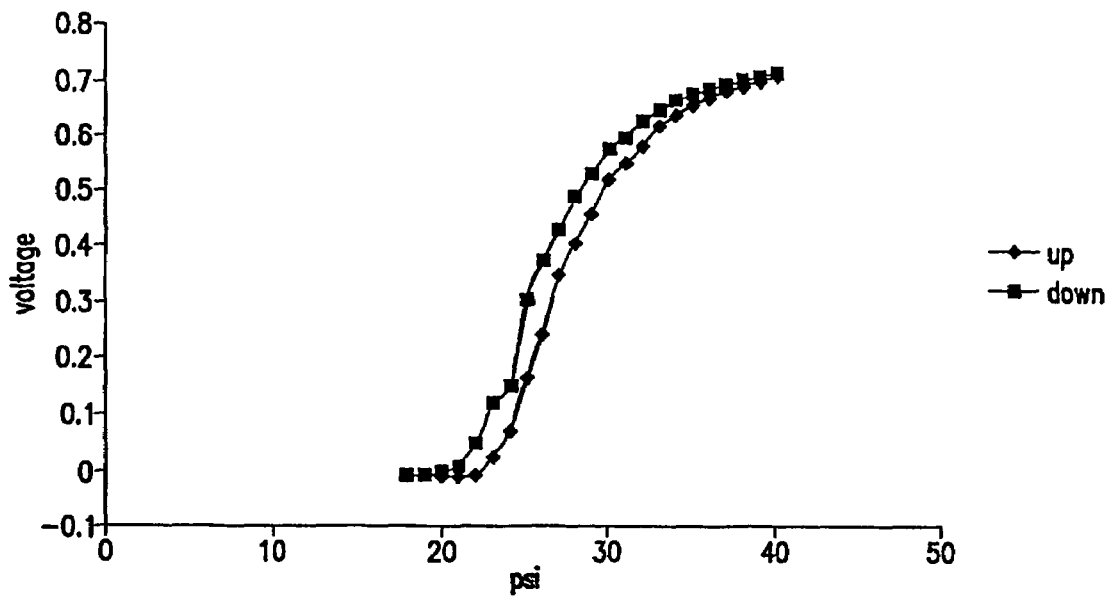
FIG. 9C is a graph of the hysteresis of the valve of FIG. 8A-8E.

The results are shown graphically in FIGS. 9A, 9B and 9C. In each graph, the curve farthest to the right represents the data for varying the pressure from low to high, and the curve to the left is the result of varying pressure from high to low. The difference between the curves represents the amount of hysteresis. Thus, as the pressure is varied up and down in steps of actuation pressure, if there were no hysteresis, the two curves would exactly overlap. FIG. 9C shows that the valve of the present invention exhibits significantly less hysteresis than the commercial valves.

EXAMPLE 3

This example illustrates the use of an embodiment of the present invention to measure and control liquid flow to enable the delivery of discrete volumes of fluid for chemical mechanical planarization substrate processing. More specifically, this example demonstrates how an embodiment of the present invention may be used to measure and control liquid flow to enable the delivery of discrete volumes of a polishing fluid to a substrate.

Chemical mechanical polishing is useful in the manufacture of optical lenses. Chemical mechanical planarization is useful in the manufacture of semiconductor devices. Polishing fluids may be acidic or basic and may contain abrasives such as silica or alumina. A fluid useful for polishing silicon dioxide includes silica slurry in an aqueous potassium hydroxide solution; a fluid useful for polishing copper metal includes an oxidizer such as hydrogen peroxide, an inhibitor such as benzotriazole, and an aqueous solution of an organic acid such as acetic acid.

The inlet of the embodiment of the present invention is connected to a pressurized or gravity feed vessel containing the polishing fluid. The flow device outlet is connected to a nozzle on the polishing tool. The polishing tool has a substrate to be polished by a rotating pad or belt. The substrate is in contact with a polishing pad that removes material from the substrate along with the chemical action of the polishing fluid. Polishing fluid is delivered to the substrate on the tool through the nozzle; flow of polishing fluid to the nozzle is controlled by the flow device and its electronics. The electronics of the flow device may be connected to the tool's controller to enable the tool to control the timing of the dispense of polishing fluid onto the substrate. The tool may also contain a polishing endpoint detector that may also be used to control the timing of the delivery of polishing fluid to the substrate. The signal processor in the electronics of the flow device eliminates the variability of polishing fluid volume and delivery rate due to pressure variations in the pressurized vessel containing the polishing fluid. Compared to peristaltic pumps, delivery of polishing fluid occurs at a constant rate. The result is controlled volume and delivery rate of polishing liquid to a substrate that minimizes chemical waste and results in more uniform and repeatable polishing of the substrate.

EXAMPLE 4

This example illustrates the use of an embodiment of the present invention to measure and control liquid flow so that discrete volumes of liquid precursors can be delivered to a vaporizer to form a gas. More specifically, this example demonstrates how an embodiment of the present invention may be used to measure and control the flow of liquid precursors to a vaporizer.

Liquid precursors are chemicals that are heated in a vaporizer to form a gas. The gas is then delivered to a heated substrate in a reaction chamber where it is further decomposed or reacts on the substrate. The gas may be used to form a thin film of a metal, a semiconductor, or a dielectric on the substrate (chemical vapor deposition or atomic layer chemical vapor deposition processes), it can be used to etch the surface of a substrate, or it can be used to dry the substrate. Liquid precursors may be pure liquids such as water, 2-propanol, or tetraethyl orthosilicate, TEOS. Liquid precursors may also contain solids such as strontium dipivaloylmethane, $Sr(DPM)_2$, dissolved in a solvent such as tetrahydrofuran. Some liquid precursors, such as copper (I) hexafluoropentanedionate vinyltrimethylsilane, (VTMS)Cu(hfac), are thermally sensitive and could be decomposed by thermal sensors used in some liquid flow meters. Liquid precursors are typically delivered to the vaporizer at a rate of about 0.1 gram per minute to about 50 grams per minute. Thin films are important in the coating of optical devices such as lenses and optical fibers. Thin films and thin film etching are also important in the manufacture of flat panels, microprocessors, and memory devices.

An embodiment of a flow device of the present invention is connected at its inlet to a pressurize source of liquid precursor. The outlet of the flow device is connected to a vaporizer. The valve for the flow device can be upstream or downstream of the vaporizer. The outlet of the vaporizer is connected to the tool's process chamber that contains the substrate to be treated by the vapor. For processes requiring multiple precursors, multiple flow devices can be used. The electronics of the flow device may be connected to the tool's controller. This permits the process tool to remotely control the flow of liquid from the pressurized source through the flow meter and into the heated vaporizer. Examples of vaporizers useful for chemical vapor deposition processes include heated metal frits, heated metal screens, heated valves, and heated tubing.

Pressure variations in the vessel containing the liquid precursor can result in changes of liquid flow to the vaporizer. Thermal decomposition of a liquid precursor in a thermal flow element can result in inaccurate liquid flow to the vaporizer. Poor flow control to the vaporizer can result in incomplete vaporization of the liquid due to vaporizer saturation. Incomplete vaporization will cause liquid droplets to enter the process chamber and cause defects on the substrate. The result of practicing this invention embodiment is the elimination of thermal flow element to control precursor flow and a repeatable and controlled flow of liquid to the vaporizer regardless of upstream pressure fluctuations.

EXAMPLE 5

This example illustrates the use of an embodiment of the present invention to measure and control liquid flow to enable the delivery of fluid to a substrate for electroless plating. More specifically, this example demonstrates how an embodiment of the present invention can be used to measure and control liquid flow to enable the dispense of a series of chemicals onto a substrate to form a metal film in plating processes. Such a process eliminates drag out of chemicals common to bath plating processes.

Solutions of metals and metal alloys useful for plating include, but are not limited to, silver, copper, platinum, palladium, gold and tin. Catalysts are often required to activate the substrates to the plating solution. These catalysts include colloidal palladium, carbon, graphite, tin-palladium colloids, and conductive polymers such as polypyrrole. The precious metals in some of these catalysts and plating solutions are expensive and waste during the plating process needs to be minimized to make the plating process cost effective. The metals in some of these solutions are toxic and waste during the plating process needs to be minimized to reduce environmental discharge as well as waste processing and disposal costs.

For each chemical used in the plating process, an embodiment of the present invention is connected at its inlet to a pressurized, pump fed, or gravity fed source of the chemical. The outlet of the embodiment of the present invention is connected at its outlet to a nozzle for delivering each chemical to the substrate. The temperatures of the solutions may be decreased or increased prior to delivery to the substrate using a heat exchanger, chiller, or resistive heater element. For example, copper metal may be deposited onto a substrate by an electroless process by contacting the substrate through a first flow device with an activator solution containing colloidal palladium, rinsing the substrate with water using a second flow device, contacting the catalyzed substrate through a third flow device with a hydrochloric acid activating solution, contacting the substrate through a fourth flow device with a volume of copper solution containing a source of cupric ion, a reducing agent like formaldehyde, a complexing agent like EDTA, and a base like potassium hydroxide. The substrate is washed with water from the second flow device.

The electronics of the flow devices may be connected to the plating tool's controller to regulate the timing, duration, and order of liquid flow through each flow device. The result is rapid and precise delivery of measured volumes of each chemical to the substrate for each step in the process. Chemical waste and materials costs are minimized by delivering only enough chemical to the substrate to ensure complete reaction. Contamination of the substrate due to chemical drag out is reduced. The overall throughput of the process is increased because of the rapid action of the flow element and valve to reduce cycle time.

EXAMPLE 6

This example illustrates the use of an embodiment of the present invention to measure and control liquid flow to enable delivery of a fluid to a substrate to form a conformal coating. More specifically, this example demonstrates how an embodiment of the present invention can be used to measure and control liquid flow to a substrate to enable precise coating of the substrate with the liquid material.

Dielectric materials, photoresists, antireflective coatings, polyimides, adhesion promoters such as hexamethyldisilazane, ferroelectric materials, and sol-gels are commonly deposited as liquids or slurry onto a substrate in a spin coating process. Such materials are delivered to a stationary or slowly rotating substrate by a fixed or movable nozzle. After the material has been delivered to the substrate it is rotated at high speeds ranging from about 100 to 5000 rpm to uniformly coat the substrate with a thin film of the liquid material. Many of these materials are costly and it is important to minimize their usage and waste in the coating process. Repeatable coatings require that consistent volumes of material be delivered to the substrates.

The inlet of an embodiment of the flow device of the present invention is connected to a pressurized or gravity fed vessel containing the coating fluid. The flow device outlet is connected to a nozzle on the coating tool. The coating tool has a substrate mounted to a rotating chuck. The coating fluid is delivered to the substrate on the tool through the nozzle; flow of coating fluid to the nozzle is controlled by the flow device and its valve. The electronics of the flow device may be connected to the tool's controller to enable the tool to control the timing and rate of coating fluid onto the substrate. By electronic communication with the flow device, the coating tool may vary the fluid flow rate onto the substrate as a function of nozzle position and substrate rotation rate in order to achieve a desired coating. The signal processor of the flow device eliminates the variability of coating fluid volume and delivery rate due to pressure variations in the vessel containing the coating fluid. The result is the delivery of a controlled volume of coating fluid to the substrate. This result minimizes chemical waste and results in more uniform ant repeatable coating of such substrates.

EXAMPLE 7

This example illustrates the use of an embodiment of the present invention to measure and control liquid flow to enable the delivery of a fluid to a substrate for reaction with the substrate. More specifically, this example demonstrates how an embodiment of the present invention can be used to measure and control the flow of a reactive liquid onto a substrate. Examples of such reactive liquids include, but are not limited to, positive or negative photoresist developers, photoresist strippers, acids such as hydrofluoric acid, oxidants such as ozonated deionized water, or etchants such as peroxyacetic acid.

The inlet of an embodiment of the flow device of the present invention is connected to a pressurized or gravity fed vessel containing the reactive fluid. The flow device outlet is connected to a nozzle or a spray nozzle on the tool. The reactive fluid is delivered to the substrate on the tool through the nozzle; flow of reactive fluid to the nozzle on the tool is controlled by the flow device and its valve. The electronics of the flow device may be connected to the tool's controller to enable the tool to control the timing and rate of reactive fluid flow onto the substrate. The electronics of the flow device may be connected through the tool's controller to a reaction endpoint detector whereby the flow rate of reactive fluid is reduced or stopped as the reaction endpoint is approached or is reached. An example of an etchant process is the removal of copper from the edges of plated wafers using peroxyacetic acid. The result is the delivery of a controlled volume of reactive fluid to the substrate and accurate control of the process endpoint using an embodiment of the present invention.

EXAMPLE 8

This example illustrates the use of an embodiment of the present invention in series with chemical sensors to measure and control liquid flow and composition. More specifically, this example demonstrates how an embodiment of the present invention can be combined with one or more chemical sensors to enable the control of fluid flow and fluid composition.

Applications where such control is desirable include but are not limited to plating baths, RCA cleaning baths, ozonated water baths, and hydrofluoric acid baths. Other applications combining such sensors with an embodiment of the present invention include maintaining the purity of a chemical bath. For example, the build up of contaminants in a recirculating bath, such as particles, organic materials, or metal ions, may require that the bath be periodically bled of contaminated fluid and replaced with an equivalent volume of uncontaminated fluid. Alternatively, the bath may be switched to a purifier or particle filter to remove the contaminants while maintaining a constant flow rate in order to protect the current process and product until the contamination can be removed.

Ozone dissolved in deionized water is used for the removal of organic materials from the surfaces of various substrates. Fluctuations in ozone generator output gas concentration and water flow rate leads to variations in dissolved ozone concentration. Such dissolved ozone concentration changes lead to variation in the time required to oxidize the substrate surface with the ozonated water and causes inconsistent process results and cleaning times.

To maintain the concentration of dissolved ozone in an overflow cleaning bath an embodiment of the present invention is connected to a source of deionized water at its inlet and its outlet is connected to a gas contactor. A gas contactor is a mass transfer device capable of dissolving gases into liquids. Examples of such devices and a description of their operation are available from W. L. Gore, Elkton, Md., and Mykrolis Corporation, Bedford, Mass. Ozone gas from an ozone generator is delivered to the shell side of the gas contactor where it dissolves into the deionized water flowing through the tubes of the gas contactor. The concentration ozone dissolved in the water is measure by a dissolved ozone concentration monitor, available from IN USA, Needham, Mass., connected to the fluid outlet of the gas contactor. The output signal from the dissolved ozone concentration monitor is used as an input signal into the electronics of the flow device of the present invention. The electronics of the present invention will vary the flow rate of water through the gas contactor, within preset limits, in order to maintain the concentration of dissolved ozone within a predetermined concentration range. For example, if the concentration of ozone gas output from the ozone generator decreases, the flow of water through the gas contactor can be decreased by the flow device to maintain the dissolved ozone concentration.

Alternatively, the electronics of the flow device of the present invention can be used to vary the ozone generator gas flow rate, or power level, by suitable means while maintaining a fixed water flow rate through the gas contactor regardless of water pressure upstream of the flow device. For example, if the concentration of dissolved ozone exceeds a predetermined threshold while the flow of water is constant, the power to the generator can be decrease to reduce the concentration of dissolved ozone back to its proper level.

The result is a controlled preparation and delivery of a chemical mixture of constant composition to a substrate by the embodiment of the invention.

EXAMPLE 9

This example illustrates the use of an embodiment of the present invention to measure and control liquid flow to enable the delivery control low volumetric flows of an organic liquid.

Figure 11:
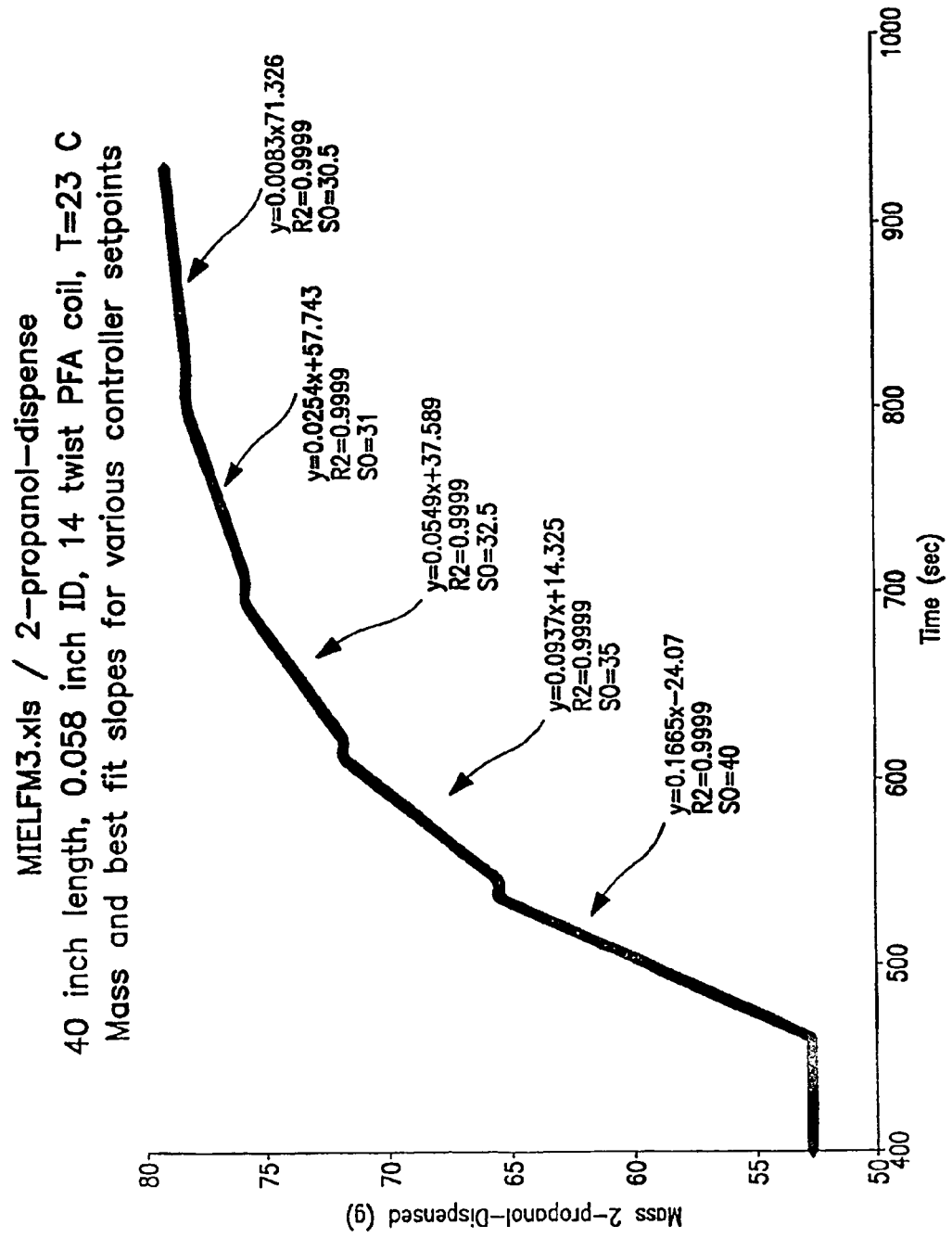
FIG. 11 is a graph of the mass of 2-propanol flow rate over time in accordance with Example 9.

A 40 inch length of PFA tubing having an inside diameter of 0.058 inches and 14 twists was used as a pressure drop element. Temperature of the inlet fluid, 2-propanol, was about 23 degrees Celsius and was from a source vessel pressurized at about 20 pounds per square inch gauge. 2-propanol flow rate as determined by the controller setpoint (SO) and valve timing were controlled by an external computer. The mass of 2-propanol delivered by an embodiment of the present invention was measured on an Ohaus Analytical Plus Balance and the mass recorded as a function of time on a second computer using the balance's RS232 port. A plot of 2-propanol mass versus time is shown in FIG. 11. Also shown in FIG. 11 are the best fit lines for each of the dispense segments; the slope in the best fit line for each segment is the 2-propanol flow rate in grams per second. The results show a flow system capable of delivering a liquid at flow rates ranging from 0.0083 grams per second (0.16 grams per minute) to about 0.49 grams per second (9.6 grams per minute). Such a flow system is capable of controlling liquid at flow rates suitable for chemical vapor deposition processes.

What is claimed is:

1. Fluid flow control apparatus, comprising: a proportional fluid control valve having a fluid inlet and a fluid outlet; a pneumatic proportional control valve in communication with said proportional fluid control valve for modulating said proportional fluid control valve; means for measuring pressure drop; a controller in communication with said pressure drop measuring means and with said pneumatic proportional control valve for controlling the flow of fluid through said proportional fluid control valve in response to said measured pressure drop; said apparatus configured to interchangeably contain one of a plurality of frictional flow elements having a frictional flow element fluid inlet in fluid communication with said fluid outlet of said proportional fluid control valve and having a frictional flow element fluid outlet spaced from said frictional flow element fluid inlet, each of said frictional flow elements comprising a helical coil having a unique length or diameter relative to any other of said plurality of frictional flow elements and creating a pressure drop between said frictional flow element fluid inlet and frictional flow element fluid outlet that is measured by said means for measuring pressure drop.

2. The fluid flow control apparatus of claim 1, further comprising means for sensing temperature of said fluid, and wherein said controller compares said sensed temperature to a predetermined temperature and controls said pneumatic proportional control valve in response to said comparison.

3. The fluid control apparatus of claim 1, wherein said means for measuring said pressure drop comprises a first pressure sensor for sensing pressure of said fluid at said fluid outlet of said proportional fluid control valve and a second pressure sensor for sensing pressure of said fluid at said frictional flow element fluid outlet.

4. The fluid control apparatus of claim 3, wherein said first pressure sensor is contained in a housing integral with said proportional fluid control valve.

5. The fluid control apparatus of claim 1, further comprising a suckback valve in pneumatic communication with said pneumatic proportional control valve.

6. The fluid control apparatus of claim 1, wherein said pneumatic proportional control valve is a solenoid.

7. The fluid control apparatus of claim 1, wherein said frictional flow element fluid inlet is in fluid communication with said fluid outlet of said proportional fluid control valve such that all of the fluid flowing from said fluid outlet of said valve must enter said fluid inlet of said frictional flow element.

8. A method of controlling the dispense of fluid from a dispenser to a point of use, comprising: providing a proportional fluid control valve having a first fluid inlet and a first fluid outlet; determining the flow characteristics of said fluid;

providing an interchangeable frictional flow element in fluid communication with said first fluid outlet, said frictional flow element comprising a helical coil having a length and diameter chosen based upon said flow characteristics to create a pressure drop across said element; sensing said pressure drop across said frictional flow element; and modulating said proportional fluid control valve in response to said sensed pressure drop.

9. The method of claim 8, wherein a pneumatic proportional control valve is provided to modulate said proportional fluid control valve pneumatically.

10. The method of claim 9, further comprising providing a controller responsive to said measured pressure drop for controlling said pneumatic proportional control valve.

11. The method of claim 8, further comprising means for regulating the fluid pressure of said fluid entering said first fluid inlet.

12. A method of controlling the dispense of fluid from a dispenser to a point of use, comprising: providing a proportional fluid control valve having a first fluid inlet and a first fluid outlet; providing a frictional flow element in fluid communication with said first fluid outlet, said frictional flow element creating a pressure drop; sensing said pressure drop across said frictional flow element; and modulating said proportional fluid control valve in response to said sensed pressure drop, wherein a pneumatic proportional control valve is provided to modulate said proportional fluid control valve pneumatically, and further comprising holding the pneumatic proportional control valve open to allow a minimum level of purge gas to bleed from the pneumatic proportional control valve.

13. The method of claim 12, wherein said frictional flow element comprises a helical coil.

14. A method of controlling the dispense of fluid from a dispenser to a point of use, comprising: providing a proportional fluid control valve having a first fluid inlet and a first fluid outlet; providing a frictional flow element in fluid communication with said first fluid outlet, said frictional flow element creating a pressure drop; sensing said pressure drop across said frictional flow element; and modulating said proportional fluid control valve in response to said sensed pressure drop, wherein a pneumatic proportional control valve is provided to modulate said proportional fluid control valve pneumatically, and wherein there are a plurality of fluid control valves, and wherein said pneumatic proportional control valve is held open at a set level such that the pneumatic pressure supplied to each said fluid control valve offsets differences among said plurality of fluid control valves allowing each said fluid control valve to open in the same amount of time and/or with the same pressure.

15. The method of claim 14, wherein said frictional flow element comprises a helical coil.

* * * * *